(12) United States Patent
Shimizu

(10) Patent No.: US 11,544,926 B2
(45) Date of Patent: Jan. 3, 2023

(54) IMAGE PROCESSING APPARATUS, METHOD OF PROCESSING IMAGE, AND STORAGE MEDIUM

(71) Applicant: CANON KABUSHIKI KAISHA, Tokyo (JP)

(72) Inventor: Tomoyuki Shimizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 17/083,375

(22) Filed: Oct. 29, 2020

(65) Prior Publication Data

US 2021/0142064 A1  May 13, 2021

(30) Foreign Application Priority Data

Nov. 7, 2019  (JP) .............................. JP2019-202618

(51) Int. Cl.
*G06V 20/40* (2022.01)
*G06T 7/73* (2017.01)
*G06N 3/08* (2006.01)

(52) U.S. Cl.
CPC .............. *G06V 20/41* (2022.01); *G06N 3/08* (2013.01); *G06T 7/75* (2017.01); *G06V 20/46* (2022.01); *G06T 2207/20081* (2013.01); *G06T 2207/20084* (2013.01)

(58) Field of Classification Search
CPC .. G06K 9/6273; G06K 9/6288; G06N 3/0454; G06N 3/08; G06N 3/084; G06T 2207/10016; G06T 2207/20081; G06T 2207/20084; G06T 7/246; G06T 7/73; G06T 7/75; G06V 10/62; G06V 10/82; G06V 20/41; G06V 20/46; G06V 2201/07

See application file for complete search history.

(56) References Cited

U.S. PATENT DOCUMENTS

| | | | | |
|---|---|---|---|---|
| 2007/0058838 | A1* | 3/2007 | Taniguchi | G06V 20/10 382/106 |
| 2007/0206849 | A1* | 9/2007 | Sakata | G06V 10/811 382/104 |
| 2009/0245573 | A1* | 10/2009 | Saptharishi | H04N 5/23206 382/103 |

(Continued)

FOREIGN PATENT DOCUMENTS

JP          2012181710 A       9/2012

OTHER PUBLICATIONS

George Papandreou, "PersonLab: Person Pose Estimation and Instance Segmentation with a Bottom-Up, Part-Based, Geometric Embedding Model," Sep. 2018, Proceedings of the European Conference on Computer Vision (ECCV), 2018, pp. 1-12.*

(Continued)

*Primary Examiner* — Omar S Ismail
(74) *Attorney, Agent, or Firm* — Carter, DeLuca & Farrell LLP

(57) ABSTRACT

There is provided with an image processing apparatus. A detection unit detects an object from a captured image. A generation unit generates a map representing a correspondence between objects detected in a plurality of captured images. A determination unit matches the objects detected in the plurality of captured images based on the generated map.

18 Claims, 13 Drawing Sheets

(56) References Cited

U.S. PATENT DOCUMENTS

| | | | |
|---|---|---|---|
| 2012/0039511 A1* | 2/2012 | Oi | G06V 20/10 |
| | | | 382/103 |
| 2014/0184812 A1* | 7/2014 | Tsuji | G06V 40/173 |
| | | | 348/169 |
| 2014/0185875 A1* | 7/2014 | Tsuji | G06V 40/161 |
| | | | 382/103 |
| 2017/0083762 A1* | 3/2017 | Segalovitz | G06V 10/25 |
| 2017/0116461 A1* | 4/2017 | Kakita | G06T 7/73 |
| 2017/0206431 A1* | 7/2017 | Sun | G06V 10/454 |
| 2018/0365888 A1* | 12/2018 | Satzoda | G06V 20/56 |
| 2019/0347486 A1* | 11/2019 | Yun | G06T 7/0002 |
| 2022/0058411 A1* | 2/2022 | Hanada | G06V 10/25 |

OTHER PUBLICATIONS

Hei Law, "CornerNet: Detecting Objects as Paired Keypoints," Sep. 2018, Proceedings of the European Conference on Computer Vision (ECCV), 2018, pp. 1-13.*

Zhong-Qiu Zhao, "Object Detection With Deep Learning: A Review," Jan. 28, 2019, IEEE Transactions on Neural Networks and Learning Systems, vol. 30, No. 11, Nov. 2019, pp. 3212-3220.*

D. Comaniciu, "Real-time tracking of non-rigid objects using mean shift," Aug. 6, 2002, Proceedings IEEE Conference on Computer Vision and Pattern Recognition. CVPR 2000 (Cat. No. PR00662), pp. 1-6.*

Comaniciu et al., "Real-time tracking of non-rigid objects using mean shift" Proceedings IEEE Conference on Computer Vision and Pattern Recognition (CVPR) (Feb. 2000) pp. 1-8.

Newell et al., "Associative Embedding: End-to-End Learning for Joint Detection and Grouping" Advances in Neural Information Processing Systems 30 (NIPS), arXiv:1611.05424v2 (Jun. 2017) pp. 1-11.

* cited by examiner

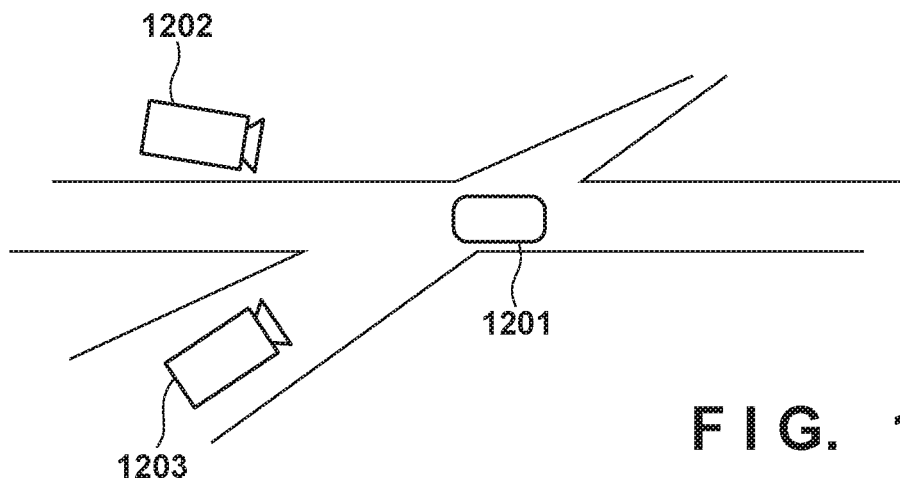
FIG. 12
FIG. 13A
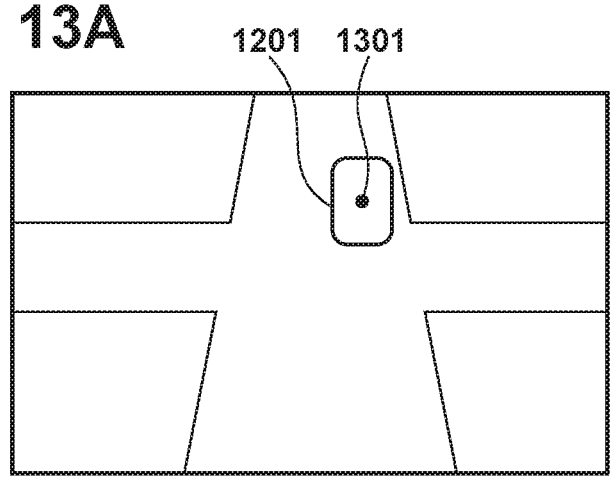
FIG. 13B
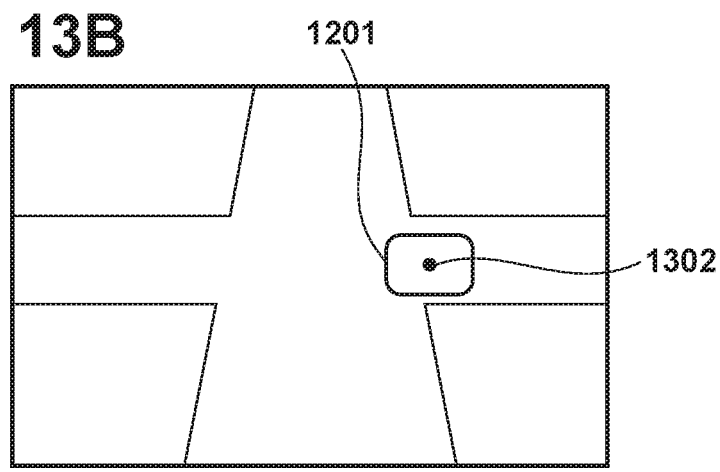

IMAGE PROCESSING APPARATUS, METHOD OF PROCESSING IMAGE, AND STORAGE MEDIUM

BACKGROUND OF THE INVENTION

Field of the Invention

The present invention relates to an image processing apparatus, a method of processing an image, and a storage medium.

Description of the Related Art

As a technique of tracking an object in a video, conventionally, a technique of matching identical regions between images included in the video is known. For example, Comaniciu (D. Comaniciu et al "Real-time tracking of non-rigid objects using mean shift". Proceedings IEEE Conference on Computer Vision and Pattern Recognition (CVPR), 2000) discloses a technique of extracting a feature amount such as a color or a histogram in a region and specifying, in a subsequent video, a region having the most similar feature amount and existing near the region, thereby sequentially tracking an object. Additionally, Japanese Patent Laid-Open No. 2012-181710 discloses a technique of predicting the position of an object in a processing target frame based on the motion of the object in a video and narrowing down a region whose feature amount is to be compared near the predicted position.

SUMMARY OF THE INVENTION

According to one embodiment of the present invention, an image processing apparatus comprises: a detection unit configured to detect an object from a captured image; a generation unit configured to generate a map representing a correspondence between objects detected in a plurality of captured images; and a determination unit configured to match the objects detected in the plurality of captured images based on the generated map.

According to one embodiment of the present invention, a method of processing an image comprises: detecting an object from a captured image; generating a map representing a correspondence between objects detected in a plurality of captured images; and matching the objects detected in the plurality of captured images based on the generated map.

According to one embodiment of the present invention, a non-transitory computer-readable storage medium stores a program that, when executed by a computer, causes the computer to perform a method of processing an image, the method comprises: detecting an object from a captured image; generating a map representing a correspondence between objects detected in a plurality of captured images; and matching the objects detected in the plurality of captured images based on the generated map.

Further features of the present invention will become apparent from the following description of exemplary embodiments (with reference to the attached drawings).

BRIEF DESCRIPTION OF THE DRAWINGS

FIG. 12 is a view showing a bird's-eye view of an example of image capturing in an image processing apparatus according to the third embodiment:

FIGS. 13A and 13B are views showing examples of captured images in the image processing apparatus according to the third embodiment;

DESCRIPTION OF THE EMBODIMENTS

Figure 1:
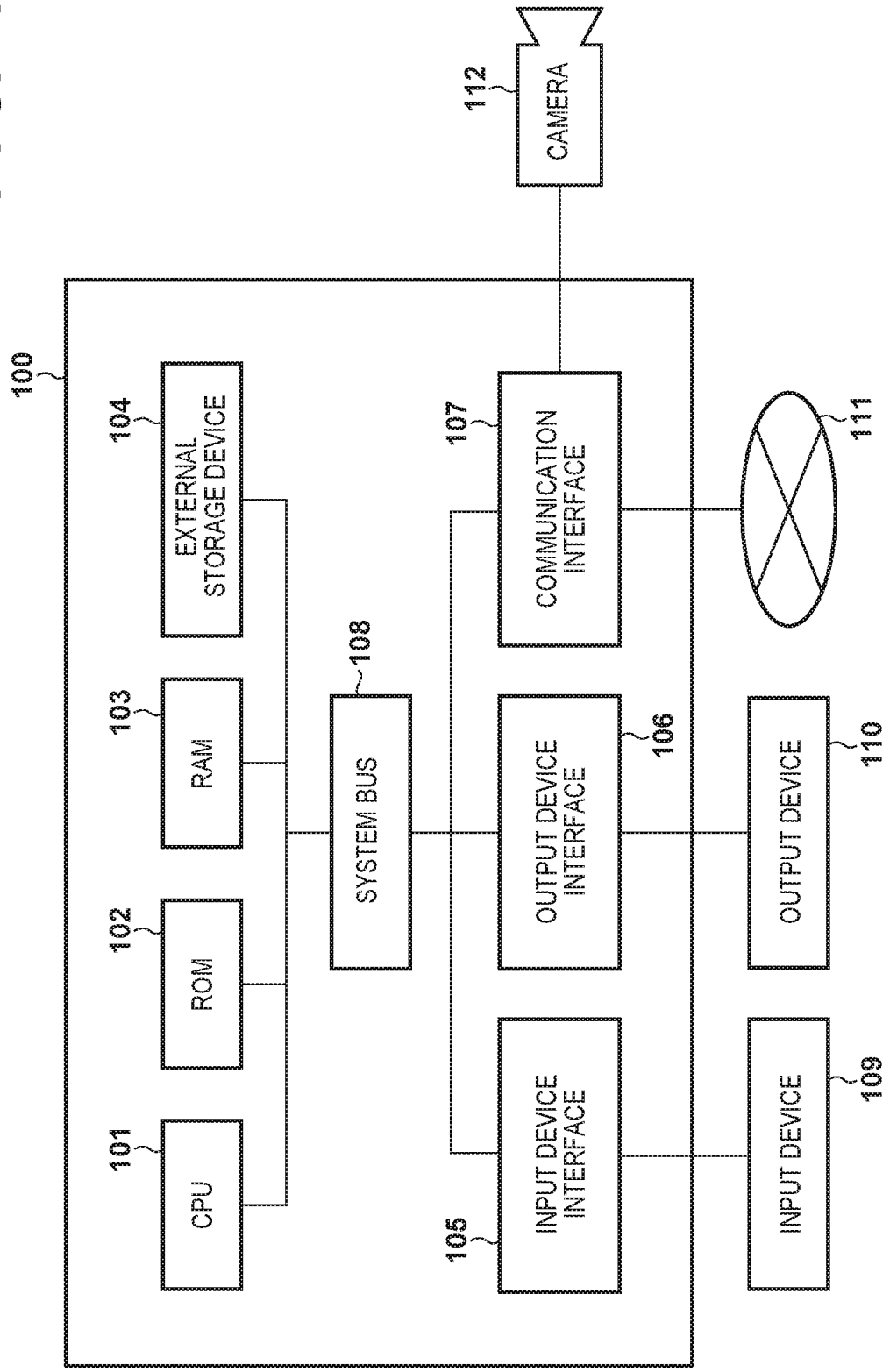
FIG. 1 is a block diagram showing an example of the functional arrangement of a computer apparatus according to each embodiment.

In the conventional techniques, there is a problem that since comparison of the feature amounts of a tracking target is performed near the substance or in the region of a moving destination predicted portion, the amount of processing by a detection apparatus increases if there are many tracking targets or if the density of tracking targets in a processing region is high.

According to an embodiment of the present invention, it is possible to reduce the cost of processing of tracking an object on an image.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 is a block diagram showing an example of the arrangement of a computer apparatus that forms an image processing apparatus according to each embodiment to be described later. The image processing apparatus may be implemented by a single computer apparatus, or may be implemented by distributing functions to a plurality of computer apparatuses as needed. If the image processing apparatus is formed by a plurality of computer apparatuses, these are connected by a LAN (Local Area Network) or the like to be communicable with each other. In the example shown in FIG. 1, a computer apparatus 100, an input device 109, an output device 110, the Internet 111, and a camera 112 are connected. The manner by which these are connected is not particularly limited. For example, these may be separately connected by wires or may be connected via wireless communication. The computer apparatus 100 and the input device 109 or the output device 110 may be independent devices, or may be devices integrally formed in one device.

The computer apparatus 100 performs image processing in each embodiment, as will be described later in detail. The input device 109 is a device configured to perform user input to the computer apparatus 100. The input device may be, for example, a pointing device or a keyboard. The output device 110 is a device such as a monitor capable of displaying images and characters to display data held by the computer apparatus 100, data supplied by user input, and an execution result of a program. The camera 112 is an image capturing device capable of acquiring a captured image. The camera 112 may, for example, acquire continuous captured images with a predetermined interval Δt to be input to an image acquisition unit 201 to be described later.

A CPU 101 is a central processing unit that controls the entire computer apparatus 100. The CPU 101 operates various kinds of software (computer programs) stored in, for example, an external storage device 104, thereby executing processing according to each embodiment and controlling the operation of the computer apparatus 100. A ROM 102 is a read only memory that stores programs and parameters, which do not need a change. A RAM 103 is a random access memory that temporarily stores programs and data supplied from an external device or the like. The external storage device 104 is an external storage device readable by the computer apparatus 100, and stores programs and data for a long time. The external storage device 104 may be, for example, a memory card and a hard disk fixed in the computer apparatus 100. Alternatively, for example, the external storage device 104 may be an optical disk such as a flexible disk (FD) or a compact disk (CD), a magnetic or optical card, an IC card, and a memory card, which are detachable from the computer apparatus 100. An input device interface 105 is an interface to the input device 109 such as a pointing device or a keyboard, which inputs data by receiving a user operation. An output device interface 106 is an interface to the output device 110 such as a monitor configured to output data held by the computer apparatus 100, supplied data, or an execution result of a program. A communication interface 107 is an interface configured to connect to be Internet 111 or the camera 112. The camera 112 may be connected to the computer apparatus 100 via the Internet 111. Reference numeral 108 denotes a system bus that communicably connects the units 101 to 107.

In each embodiment, programs that are stored in the external storage device 104 and implement the functions of the units are read out to the RAM 103. The CPU 101 operates in accordance with the programs on the RAM 103, thereby implementing the functions of the units. In this case, the device that stores various kinds of programs, various kinds of setting data sets, and the like is not limited to the external storage device 104. For example, the computer apparatus 100 may acquire various kinds of programs, various kinds of setting data, and the like from a server or the like via a network (not shown).

First Embodiment

Figure 2:
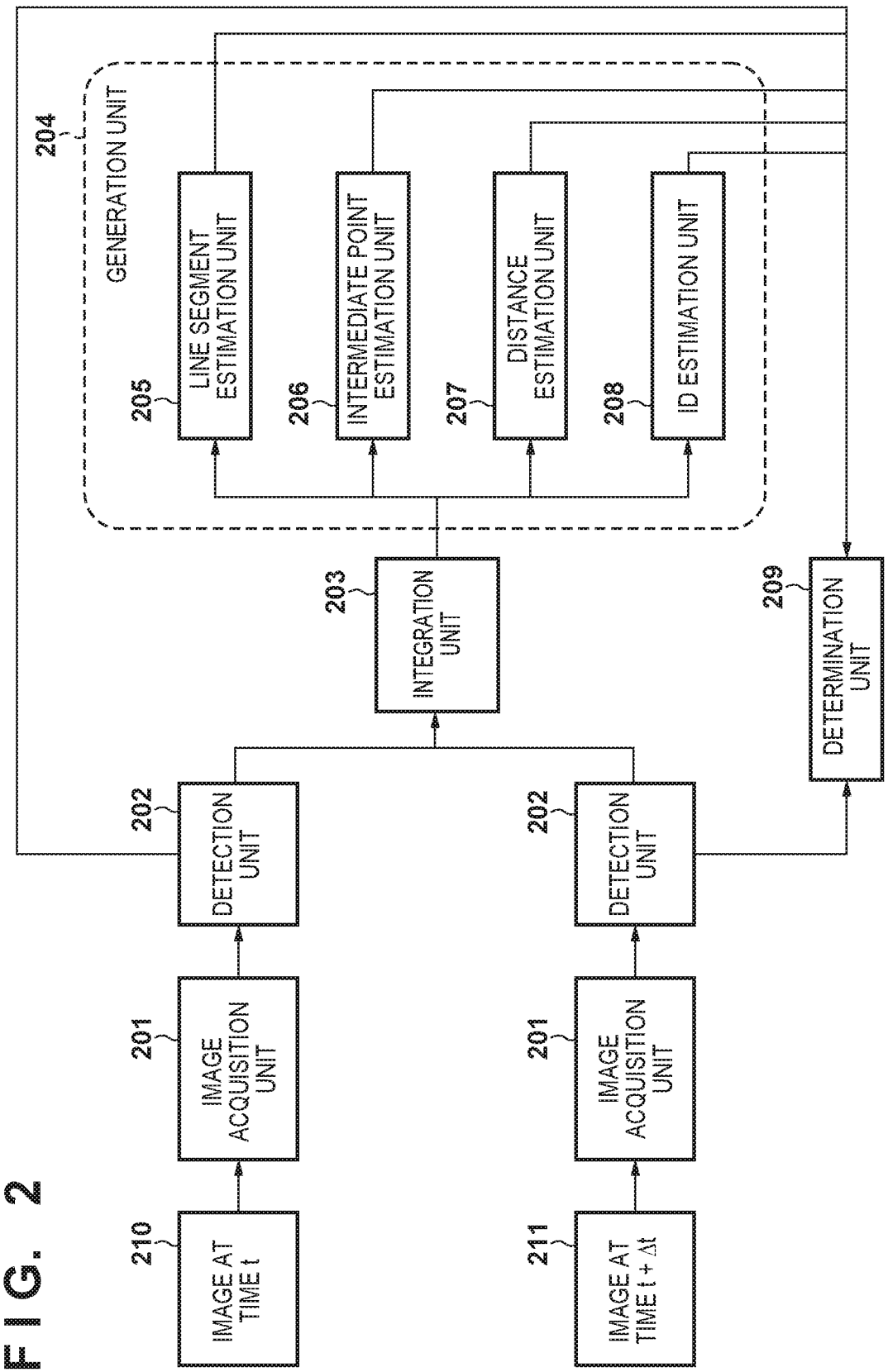
FIG. 2 is a block diagram showing an example of the functional arrangement of an image processing apparatus according to the first embodiment.

FIG. 2 is a block diagram showing an example of the functional arrangement of an image processing apparatus according to the first embodiment. The image processing apparatus according to this embodiment generates a map representing the correspondence between objects detected in captured images at a plurality of times. Next, the objects detected in the plurality of captured images are matched based on the generated map. For the processing, the image processing apparatus according to this embodiment includes an image acquisition unit 201, a detection unit 202, an integration unit 203, a generation unit 204, and a determination unit 209. Hereinafter, assume that matching indicates associating images of a single object which are detected in captured images at a plurality of times. Assume that the correspondence indicates the relationship between objects to be matched. Even if it is found that there is a correspondence, associating representing that objects are identical is not performed until matching is performed.

The image acquisition unit 201 acquires, from a camera 112, an image as an input to the image processing apparatus according to this embodiment. For example, in a moving image captured by the camera, the image acquisition unit 201 may acquire two frame images having a predetermined frame interval. That is, in the example shown in FIG. 2, the image acquisition unit 201 acquires an image 210 at time t and an image 211 at time t+Δt.

The detection unit 202 detects a specific object as an object from each image acquired by the image acquisition unit 201, and specifies the coordinates of the detection position on each image. The object to be detected by the detection unit 202 is not particularly limited. The detection unit 202 may detect, for example, a specific part of an object. That is, for example, if the object is a person, the detection unit 202 may detect a specific joint such as a neck or a waist of a person or a specific part such as a belonging held by the object. In addition, the detection unit 202 may detect a plurality of specific parts and perform matching processing to be described below for each of the parts. For example, in a monitoring video of a person, usable information may be limited in accordance with congestion, the angle of view of a camera, difficulty in target detection, or the like. That is, a case in which the neck position of a person as an object is occluded, and the top portion and the shoulders are visible, or a case in which the person wears a hat, and the detection accuracy of the top portion is not sufficient can be considered. According to processing of detecting a plurality of parts and matching them, even in a case in which some specific parts cannot be detected because of, for example, congestion or occlusion, when matching is performed based on the detection results of the plurality of parts, matching with improved robustness to the image capturing situation can be performed. For the sake of simplicity, assume that the coordinates of a specific part held by an object to be used for detection will be referred to as a detection position hereinafter. When performing matching using a plurality of parts, for example, the scores of the parts are totalized using score of matching to be described later. Also, a weighted average of scores may be calculated using a preset weight, or the maximum value of the scores of the parts may be acquired. According to this processing, when general determination based on the scores of a plurality of parts is performed, the determination unit 209 can perform matching processing with improved robustness.

In this embodiment, the detection unit 202 is a convolutional neural network (CNN) (the CNN provided in the detection unit 202 will be referred to as a detection CNN hereinafter) configured to output the existence position of a specific part of an object in an image. The detection unit 202 has already learned a task of detecting a specific part of an object in advance. In addition, the detection unit 202 outputs an output from the intermediate layer of the detection CNN in the detection on process of the integration unit 203 as a feature amount of an acquired image. Since the output of the intermediate layer of the detection CNN, which is output from the detection unit 202, is used as a feature amount, the generation unit 204 can perform a learning phase and an estimation phase of a map to be described later. Hence, when referring to a map based on a detection position by the detection CNN, it is possible to refer to an appropriate position with little deviation between the detection position and coordinate positions referred to on the map.

The integration unit 203 integrates feature amounts acquired from images. In this embodiment, the integration unit 203 can concatenate feature amounts output from the detection unit 202. However, the method of integrating feature amounts by the integration unit 203 is not particularly limited to this. For example, the integration unit 203 may be formed by a neural network that integrates feature amounts. In this case, the integration unit 203 may be learned such that intermediate features are weighted and integrated at the same time as the learning of the generation unit 204 to be described later. The integration unit 203 may be formed by a multistage CNN, may be formed by an RNN (Recurrent Neural Network) to store time-series information, or may be formed by a three-dimensional CNN including a time axis.

Based on feature amounts held by a plurality of images, the generation unit 204 generates a map representing the correspondence between objects in images. In the example shown in FIG. 2, the generation unit 204 can generate a map using the feature amount concatenated by the integration unit 203 as an input. That is, based on the image 210 and the image 211, the generation unit 204 can generate a map representing the correspondence between objects in the images. To improve the robustness of matching, the generation unit 204 may generate a plurality of types of maps. For this purpose, in this example, the generation unit 204 includes a line segment estimation unit 205, an intermediate point estimation unit 206, a distance estimation unit 207, and an ID estimation unit 208 (for the sake of simplicity, any one of these units will be referred to as an estimation unit hereinafter). In this case, for one set of images 210 and 211, for example, all the estimation units may generate maps, some estimation units may generate maps, or one estimation unit may generate a map. In addition, the estimation units (that is, maps to be generated) provided in the generation unit 204 are not particularly limited to these if they can generate a map representing the relationship between objects to be matched in captured images. Examples other than the maps generated by the above-described four estimation units will be described later.

Each of the estimation units 205 to 208 can generate a map with information specific to the map in a predetermined region determined based on the coordinates of the detection position of an object. Details of generation processing of such maps will be described later with reference to FIGS. 4 to 7. In this example, a map is data generated by an estimation unit using a captured image to be matched as an input. The determination unit 209 refers to pixel values in a predetermined region on a map, thereby acquiring information specific to the map and performing matching determination of the object. For example, the determination unit 209 can convert the coordinates of a detection position in each of the images 210 and 211 into coordinates on a map, and perform matching determination of the object using pixel values in a predetermined region based on the converted coordinates. Details of the process will be described later. In this embodiment, the generation unit 204 is formed by a CNN. The CNN provided in the generation unit 204 will be referred to as a generation CNN hereinafter. That is, in this example, at least one of CNNs provided in the estimation units 205 to 208 will be referred to as a generation CNN hereinafter.

The generation CNN is a multistage network including a plurality of convolution layers, and its arrangement is not particularly limited. The output layer of the generation CNN may output, for example, one map having a predetermined vertical/horizontal size or may output N maps having a predetermined vertical/horizontal size×N dimensions. Each estimation unit provided in the generation unit 204 is learned in advance such that if the feature amounts of a plurality of images are input, a map in which pixel values in a predetermined region determined based on the coordinates of detection positions have values representing whether the objects correspond is output. In this learning, each estimation unit may learn pixel values provided in one map, or may learn a vector having, as elements, pixel values provided in a plurality of maps. Additionally, in this learning, each estimation unit may be learned to output a whole map, or may be learned only for pixel values output in a predetermined region in a map, which are referred to by the determination unit 209. For example, as for a map in which only pixels at detection positions or on the periphery thereof and intermediate points of the detection positions are referred to, learning may be done such that the output of the pixel values in the region to be referred to becomes similar to correct answer data.

The determination unit 209 refers to a map generated by the generation unit 204 and performs matching of objects between a plurality of images. In the example shown in FIG. 2, the determination unit 209 can perform matching of objects between the images 210 and 211. Hence, the determination unit 209 can convert the coordinates of a detection position in each of the images 210 and 211 into coordinates on a map, which correspond to the coordinates. For example, if the size of the captured image used for detection and the size of the map are equal, the determination unit 209 may directly use the coordinates of the detection position in each image as coordinates on the map. If the size of the captured image used for detection and the size of the map are different, the determination unit 209 may convert the coordinates of the detection position on the captured image into coordinates on the map. Next, based on the converted coordinates of each detection position, the determination unit 209 may acquire the position of a predetermined region on the map determined in advance for each estimation unit. Also, the determination unit 209 can calculate the score of matching from the pixel values in the predetermined region and perform matching of the object based on the calculated score. The predetermined region and the processing based on the predetermined region change in accordance with the map to be used, and a detailed description thereof will be made later with reference to FIGS. 4 to 7. Hereinafter, assume that two images indicate the image 210 and the image 211.

Figure 3:
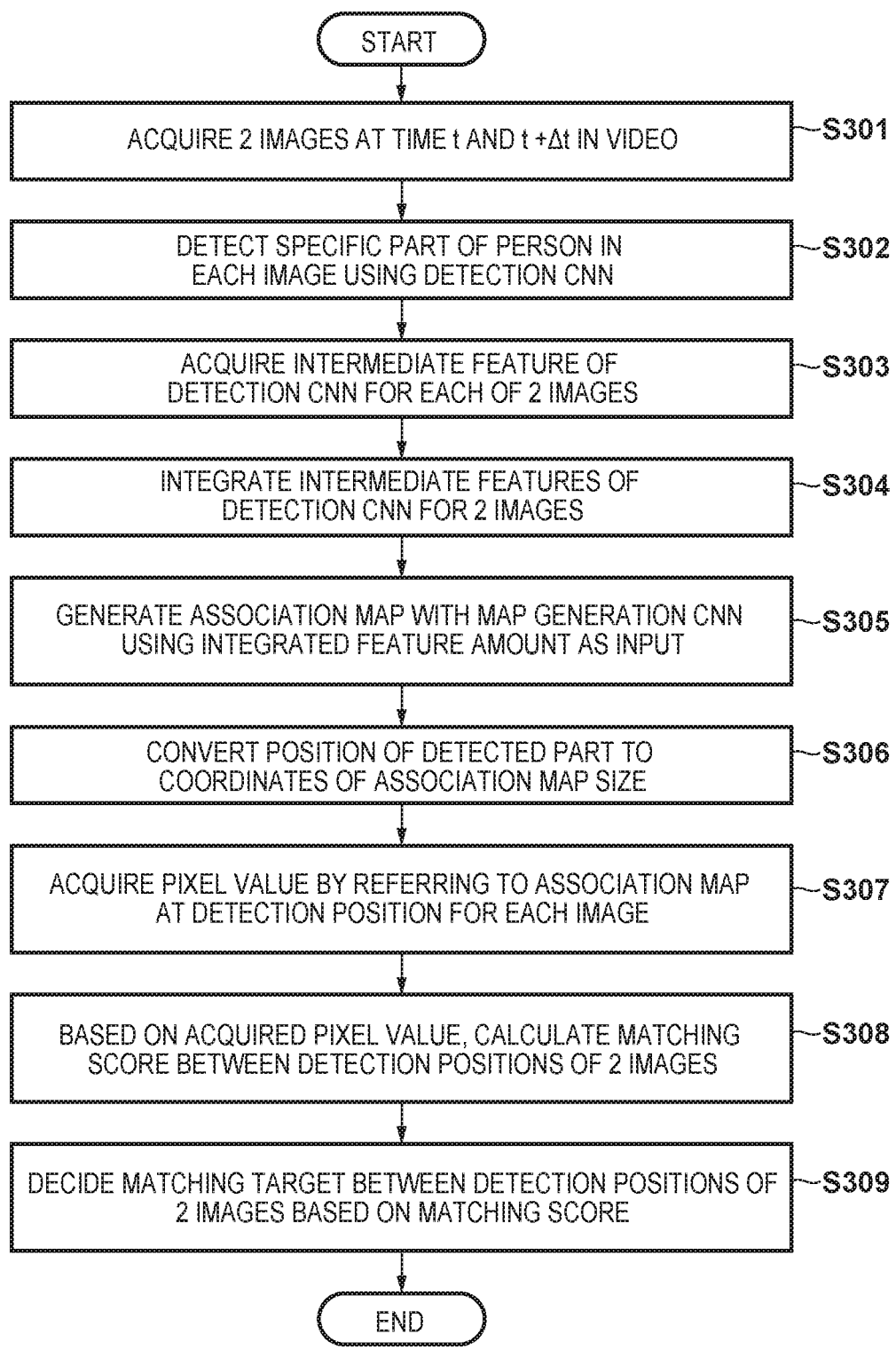
FIG. 3 is a flowchart of an example of processing in an image processing method according to the first embodiment.

FIG. 3 is a flowchart of an example of a processing procedure by the image processing apparatus according to this embodiment. If two frame images captured by one camera 112 and having a predetermined frame interval are input, the image processing apparatus in the example shown in FIG. 3 associates, between the two images, identical parts of objects to be matched, which are detected in the images. That is, for example, the camera 112 that is a monitoring camera installed at a position to monitor the motion of a person can associate identical persons between images to track how the person in the image has moved between two frame images in a video.

In step S301, the image acquisition unit 201 acquires a total of two frame images at times t and t+Δt from a video captured by the camera 112. The value of a predetermined interval Δt is not particularly limited. The image acquisition unit 201 can acquire frame images captured at an interval of, for example, 0.5 sec. In step S302, the detection unit 202 inputs the frame images acquired in step S301 to the detection CNN, thereby detecting a specific part of an object in each image and acquiring the coordinates of the specific part of the object. The frame images may be input to a plurality of detection units 202, respectively, or may be input to a single detection unit 202. In step S303, the integration unit 203 acquires, for each frame image, an intermediate feature in the detection processing step by the detection CNN, which is to be used in step S304, from the detection unit 202. In step S304, the integration unit 203 integrates the intermediate features acquired from the two images. For the descriptive convenience, the integration unit 203 is assumed to concatenate feature amounts output from the detection CNN. However, the processing is not limited to this, as described above.

In step S305, each estimation unit provided in the generation unit 204 outputs a map representing the correspondence between objects in the two images when the feature amount concatenated in step S304 is input. When the map is created using the intermediate features output from the detection unit 202, it is possible to suppress a deviation between the position of the detected object and the position of the object on the map. In addition, when the intermediate features output from the detection unit 202 are reused, the processing cost concerning map creation can be reduced. In step S305, all the estimation units may create maps, a plurality of estimation units may selectively create maps, or one estimation unit may create a map. In steps S306 to S308 to be described below, steps for one map will be described. If a plurality of maps are generated, the processing is performed for each map in accordance with the same procedure.

In step S306, the determination unit 209 converts the coordinates of the detection positions on the two images into coordinates on the map and acquires them. For example, if the size of the map output from the generation CNN is different from that of the captured image, the determination unit 209 may acquire the pixel coordinates of the detection position in the captured image converted into the same size as the map, as described above, as the coordinates of the detection position on the map. The generation CNN may be learned to output a map having information specific to the map to a predetermined region determined based on the coordinates obtained by converting the coordinates of the detection target on the input image based on the size difference between the input image and the output image into coordinates on the map.

In step S307, the determination unit 209 acquires the position of the predetermined region on the map based on the map output in step S305 and the coordinates of the detection position on the map, which are acquired in step S306. Next, the determination unit 209 acquires pixel values in the region. In step S308, the determination unit 209 calculates, from the pixel values acquired in step S307, scores to be used for matching between each object at time t and each object at time t+Δt. In step S308, the scores may be calculated for all combinations of objects at each time, or the scores may be calculated for some combinations. The position of the region to acquire pixel values by the determination unit 209 and the score calculation method are not particularly limited, and in this example, these can change in accordance with the map to be used. Hence, a detailed processing procedure will be described with reference to FIGS. 4 to 7 to be described later.

In step S309, the determination unit 209 performs matching between the objects in the two images based on the scores calculated in step S308. For example, the determination unit 209 may perform matching based on scores in one map, or may perform matching by integrating scores in a plurality of maps. When integrating scores in a plurality of maps, the integration method is not particularly limited. The determination unit 209 may set the sign and range of scores in each map to the range of 0 to 1 as scores for which, for example, the larger the value is, the higher the possibility of matching between the objects in the two images is, and obtain the product of the scores, thereby integrating the scores. The method of calculating scores to be integrated in this way will be described later with reference to FIGS. 4 to 7. Additionally, for example, the determination unit 209 may integrate the scores calculated for each map by adding a predetermined weight given in advance and performing linear concatenation. Also, for example, the determination unit 209 may appropriately combine the scores by a known heuristic method based on the range of the values of the scores or the estimation accuracy. Furthermore, the determination unit 209 may statistically obtain, from sample data, weighting of linear concatenation to obtain an optimum combination using a known method such as logistic regression. The matching accuracy can thus be improved by performing matching determination considering a plurality of maps.

The determination unit 209 may integrate all the scores calculated in step S308, or may selectively integrate some of them. For example, the determination unit 209 may evaluate the calculated scores using a predetermined threshold, and selectively integrate scores having values equal to or larger than the threshold. According to this processing, it is possible to perform matching in consideration of variations in values caused by the state of each target (the state of occlusion of an object part, the degree of concentration of objects, the size of each object in an image, and the like). That is, for example, it is possible to suppress a matching error caused by occlusion of a specific part of an object.

An additional explanation will be made next concerning examples of the estimation units provided in the generation unit 204 and the processes of steps S306 to S309 with reference to the flowcharts of FIGS. 4 to 7. The flowcharts of FIGS. 4 to 7 show score calculation procedures for the maps generated by the estimation units.

In step S305, each estimation unit outputs a map representing the correspondence between the objects in the captured images from the feature amounts acquired by the detection unit 202. That is, in this example, based on correct answer data, the estimation unit is learned such that a feature amount obtained by concatenating the feature amounts of two images is input, and a map representing the correspondence between the objects in the images is output. Each estimation unit generates a map having information specific to the map in a predetermined region determined based the coordinates of the detection positions in the two input images on the map corresponding to the estimation unit. That is, a map capable of matching determination is generated by referring to the pixel values in the predetermined region.

The line segment estimation unit 205 can generate a map (to be referred to as a line segment map hereinafter) having different pixel values in a region on a line segment that connects the detection positions of objects to be matched and a region other than that region. That is, the line segment estimation unit 205 may generate a map representing a likelihood concerning whether the referred objects correspond, in which a likelihood value close to 1 is obtained when the pixel values in the region on a line segment that connects the detection positions of objects to be matched are referred to, and a likelihood value close to 0 is easily obtained when the region other than that region is referred to. It is assumed that the pixel values set here are not limited to these, and may appropriately be set to desired values. A description will be made below according to this.

The generation CNN provided in the line segment estimation unit 205 may be learned by a known method such as a method in, for example, Newell (A. Newell et al, "Associative Embedding: End-to-End Learning for Joint Detection and Grouping", Advances in Neural Information Processing Systems 30 (NIPS), 2017). That is, the line segment estimation unit 205 may be given, as correct answer data, a map having a distribution of pixel values as described above, which are output when the feature amounts of two images including objects to be matched are input to the generation CNN. The line segment estimation unit 205 can perform learning by performing back propagation using, for example, a cross entropy error based on the correct answer data and the output obtained when the two images are input such that the correct answer data can be output when the two images are input. The cross entropy error is known, and a detailed description thereof will be omitted.

As for the line segment map, in step S307, the determination unit 209 can acquire the pixel value of each pixel on the line segment that connects the corresponding coordinates of the detection positions of one set of objects in the two images. Next, in step S308, the determination unit 209 can integrate the set of acquired pixel values and calculate, as a score, a value obtained by dividing the integrated value by the number of pixels of the acquired pixel values. That is, the average of the pixel values on the referred line segment can be calculated as a score. In step S309, the determination unit 209 performs matching, as described above, using the thus calculated score.

Figure 4:
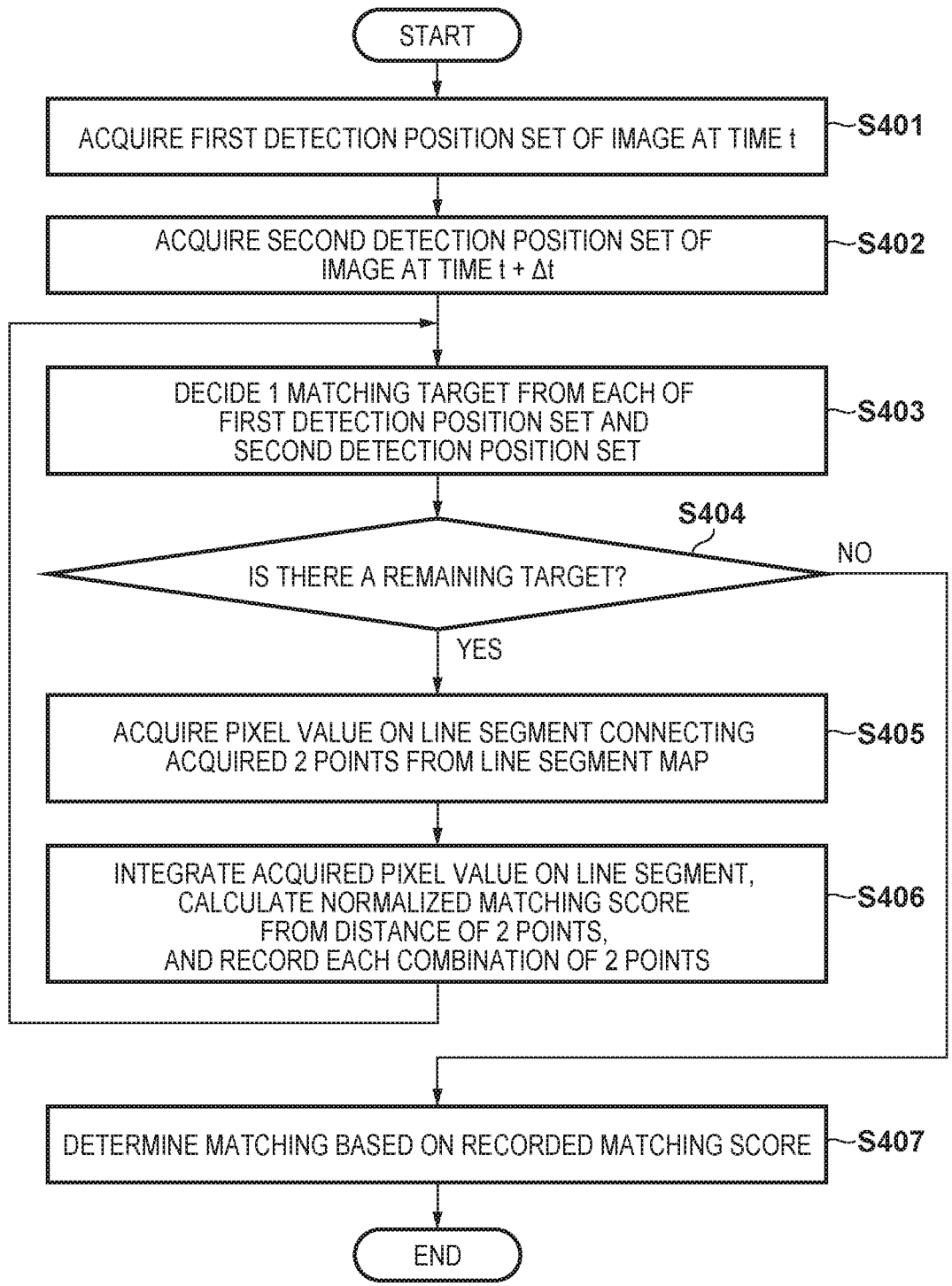
FIG. 4 is a flowchart of an example of generation of a line segment map according to the first embodiment.

FIG. 4 is a flowchart of an example of the processing procedure of score calculation processing using a line segment map according to this embodiment. Steps S401 and S402, steps S403 to S405, step S406, and step S407 correspond to steps S306 and S307, step S308, and step S309 in FIG. 3, respectively. In step S401, the determination unit 209 acquires a set of detection positions (to be referred to as first detection positions hereinafter) of an object in an image at time t detected by the detection unit 202. In step S402, the determination unit 209 acquires a set of detection positions (to be referred to as second detection positions hereinafter) of an object in an image at time t+Δt detected by the detection unit 202. In steps S401 and S402, the determination unit 209 converts the coordinates of the detection positions in the two images into corresponding coordinates on the line segment map and acquires them, as described above.

In step S403, the determination unit 209 selects a combination of detection positions to calculate one score each from the first detection positions and the second detection positions. In this embodiment, the determination unit 209 selects detection positions from the whole set of first detection positions and the whole set of second detection positions. However, the present invention is not particularly limited to this. The determination unit 209 may select detection positions from a combination of first detection positions and a combination of second detection positions, which are selected based on a predetermined condition. For example, the determination unit 209, in relation to the first detection position, may select a second detection position from second detection positions existing within a predetermined range with a first detection position at the center. In addition, for example, the determination unit 209 can acquire moving information such as a moving direction and speed for each object based on the matching result before time t. Next, the determination unit 209 may estimate an approximate moving position of the object at time t+Δt from the moving information, and select, for each first detection position, a second detection position from a range determined based on the estimated moving position. In this example, steps S403 to S406 can repetitively be performed. The determination unit 209 performs selection while excluding the combinations of first detection positions and second detection positions selected in preceding repetitions.

In step S403, the determination unit 209 may perform selection while excluding combinations in which the Euclidean distance between the first detection position and the second detection position is equal to or more than a predetermined threshold. Here, the threshold can be set in accordance with the size of the object. When the combinations of objects that are largely apart from each other are excluded, and processing for such combinations is omitted, the processing cost can be reduced.

In step S404, the determination unit 209 determines whether an unprocessed combination of detection positions could be selected in step S403. That is, the determination unit 209 determines whether matching processing has been done for all combinations of detection positions. If an unprocessed combination could be selected, the process advances to step S405. If an unprocessed combination does not remain, the process advances to step S407.

Figure 8A:
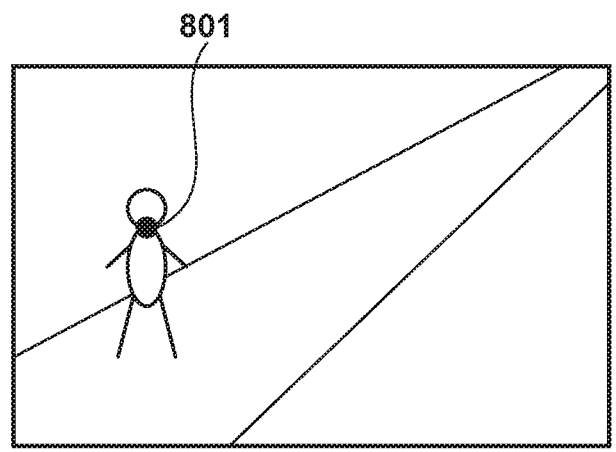
FIGS. 8A and 8B are views showing examples of a plurality of captured images in the image processing apparatus according to the first embodiment.
Figure 8B:
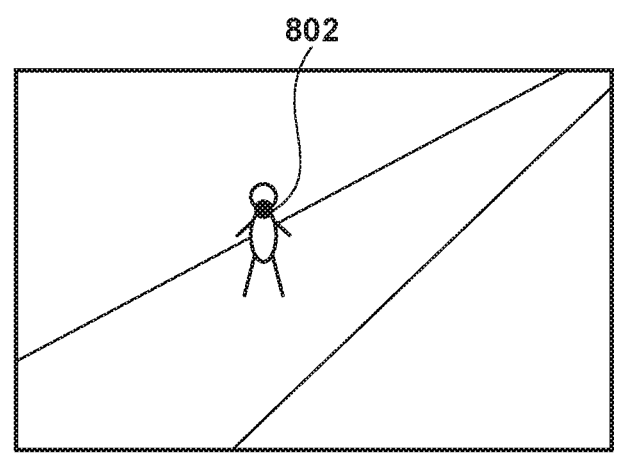
Figure 9A:
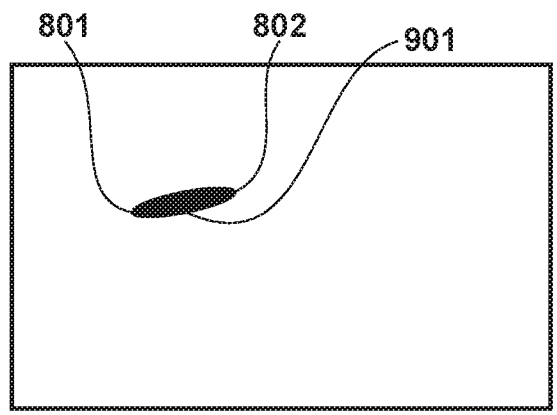
FIGS. 9A to 9D are views showing examples of map generation in the image processing apparatus according to the first embodiment.

In step S405, the determination unit 209 refers to pixels on a line segment that connects, on the line segment map, the coordinates of the detection positions selected in step S403, and acquires the pixel values. This processing will be described with reference to FIGS. 8A, 8B, and 9A. FIGS. 8A and 8B show captured images at times t and t+Δt, in which a neck position 801 of a person at time t and a neck position 802 of the person at time t+Δt are shown. In this case, the line segment estimation unit 205 generates a line segment map having different pixel values in a region on a line segment that connects the neck positions 801 and 802 of the objects to be matched and a region other than that region. FIG. 9A is a view showing the thus generated line segment map.

The line segment estimation unit 205 performs estimation ideally such that the line segment that connects the coordinates corresponding to the neck positions 801 and 802 on the line segment map is output on the line segment map. FIG. 9A shows a line segment 901 output in this way. FIG. 9A shows an example in which a line segment map concerning one person is output. However, the present invention is not particularly limited to this. If a plurality of persons exist, a plurality of line segments according to the detection positions of the persons are estimated and output. As described above, the line segment map is generated such that the value of a pixel on the line segment between the neck positions of the same person is close to 1, and the value of a pixel value in an otherwise region is close to 0.

Note that the line segment output on the line segment map may be a line segment having a minimum thickness, or may be a thicker line segment. For example, as shown in FIG. 9A, the line segment 901 may be represented by a pixel group having a distribution of pixel values according to a Gaussian distribution with respect to the line segment that connects points on the line segment map corresponding to the neck positions 801 and 802 as the center. As described above, the line segment that connects two points may be expressed by a pixel group having pixel values equal to or larger than a predetermined threshold.

In step S405, the determination unit 209 can select one object at each of times t and t+Δt, and acquire pixel values on a line segment that connects the coordinates of the detection positions (for example, joint positions) of the selected objects on the line segment map. Note that in step S405, instead of acquiring pixel values on a line segment that has the minimum thickness and connects two points, the determination unit 209 may acquire pixel values by referring to pixel values in a region having a predetermined width with respect to such a line segment as the center. As an example, as the pixel values of pixels on a line segment that connects two points, the determination unit 209 may acquire the maximum pixel value or average pixel value within a predetermined range (for example, a range of 3×3 pixels) with each pixel at the center.

In step S406, the determination unit 209 calculates the integrated value of the pixel values acquired in step S405, and divides the calculated integrated value by the number of pixels in the line segment, thereby calculating a score. If the two points selected in step S403 belong to the same person, the pixels on the line segment that connects the two points are located near the pixels on the line segment on the line segment map. Hence, when the acquired pixel values are integrated, the integrated value is close to 1×the value of the number of pixels in the line segment. The closer to 1 the matching score is, the higher the possibility that the combination of the two points represents the combination of identical persons is. Conversely, since no line segment is output for another person, the matching score obtained in the above-described way becomes smaller than 1. When the thus obtained matching score is used, it can be determined whether the combination of the two points represents the same person. Note that in this example, the average of the pixel values in the region referred to by the determination unit 209 is used as the score. However, the method of calculating a value to be used as a score is not particularly limited to this. For example, the determination unit 209 may calculate the median from the set of acquired pixel values, may calculate a weighted average so that the weight becomes larger the closer it is to the above-described line segment serving as the center, or may obtain the maximum value. As in this embodiment, when the map that outputs values to the plurality of pixels on the line segment is used, matching can robustly be performed even if a partial loss occurs due to an estimation error, or a detection position slightly deviates.

Next, the determination unit 209 stores the scores calculated here and the combinations of detection positions in a storage device, and returns to step S403. The storage device may be the external storage device 104 or may be a storage device connected via wireless communication. As described above, the combination of detection positions to be selected next in step S403 is selected from the combinations that are not stored in the storage device yet at that point of time.

In step S407 in a case in which it is determined that all combinations of detection positions have been selected in step S403, the determination unit 209 performs matching of the objects according to the detection positions based on the scores and the combinations stored in the storage device. In this embodiment, assume that the determination unit 209 performs matching using all scores on each map. However, the present invention is not limited to this, as described above. For example, when performing matching based on only scores on the line segment map, the determination unit 209 may select a second detection position that forms the combination of the highest score, for each first detection position. In this case, if, for one second detection position, a plurality of first detection positions for which a second detection position is selected to obtain the combination of the highest score exist, the combination of the highest score in the combinations is preferentially selected. Next, for a first detection position for which such a second detection position cannot be selected as a combination, a second detection position that forms the combination of the highest score may be selected once again from second detection positions except the second detection position. Also, for example, the determination unit 209 may perform matching of the objects using a known assignment method such as a greedy algorithm or a Hungarian algorithm. Alternatively, to reduce the processing cost, the determination unit 209 may perform matching after removing a score having a value smaller than a desired threshold that can be determined in advance from scores on the line segment map or on an intermediate point map to be described later. The determination unit 209 can set the threshold appropriately as a desired value in accordance with the degree of concentration and the sizes of objects, and the like.

The intermediate point estimation unit 206 can generate a map (to be referred to as an intermediate point map hereinafter) having different pixel values at the intermediate point of a line segment that connects the detection positions of objects to be matched and a region other than that region. The intermediate point estimation unit 206 may generate a map in which, for example, the pixel value of the intermediate point of the line segment that connects the detection positions of the objects to be matched is set to 1, and pixel values in a region other than that point are set to 0. That is, the intermediate point estimation unit 206 may generate a map representing a likelihood concerning whether the referred objects correspond, in which a likelihood value close to 1 is obtained when the pixel value of the intermediate point of a line segment that connects the detection positions of objects to be matched is referred to, and a likelihood value close to 0 is easily obtained when the region other than that point is referred to. It is assumed that the pixel values set here are not limited to these, and may appropriately be set to desired values. A description will be made below according to this.

The generation CNN provided in the intermediate point estimation unit 206 may be learned by a known method such as a method in, for example, Newell (A. Newell et al, "Associative Embedding: End-to-End Learning for Joint Detection and Grouping". Advances in Neural Information Processing Systems 30 (NIPS), 2017). That is, the intermediate point estimation unit 206 may be given, as correct answer data, a map having a distribution of pixel values as described above, which are output when the feature amounts of two images including objects to be matched are input to the generation CNN. The intermediate point estimation unit 206 can perform learning by performing back propagation using, for example, a cross entropy error based on the correct answer data and the output obtained when the two images are input such that the correct answer data can be output when the two images are input.

In step S307, the determination unit 209 can acquire the pixel value of the intermediate point of the line segment that connects coordinates on the intermediate point map, which correspond to the coordinates of the detection positions of one set of objects in the two images. Next, in step S308, the determination unit 209 can record the acquired pixel value as a score. In step S309, the determination unit 209 performs matching, as described above, using the score recorded in step S308.

Figure 5:
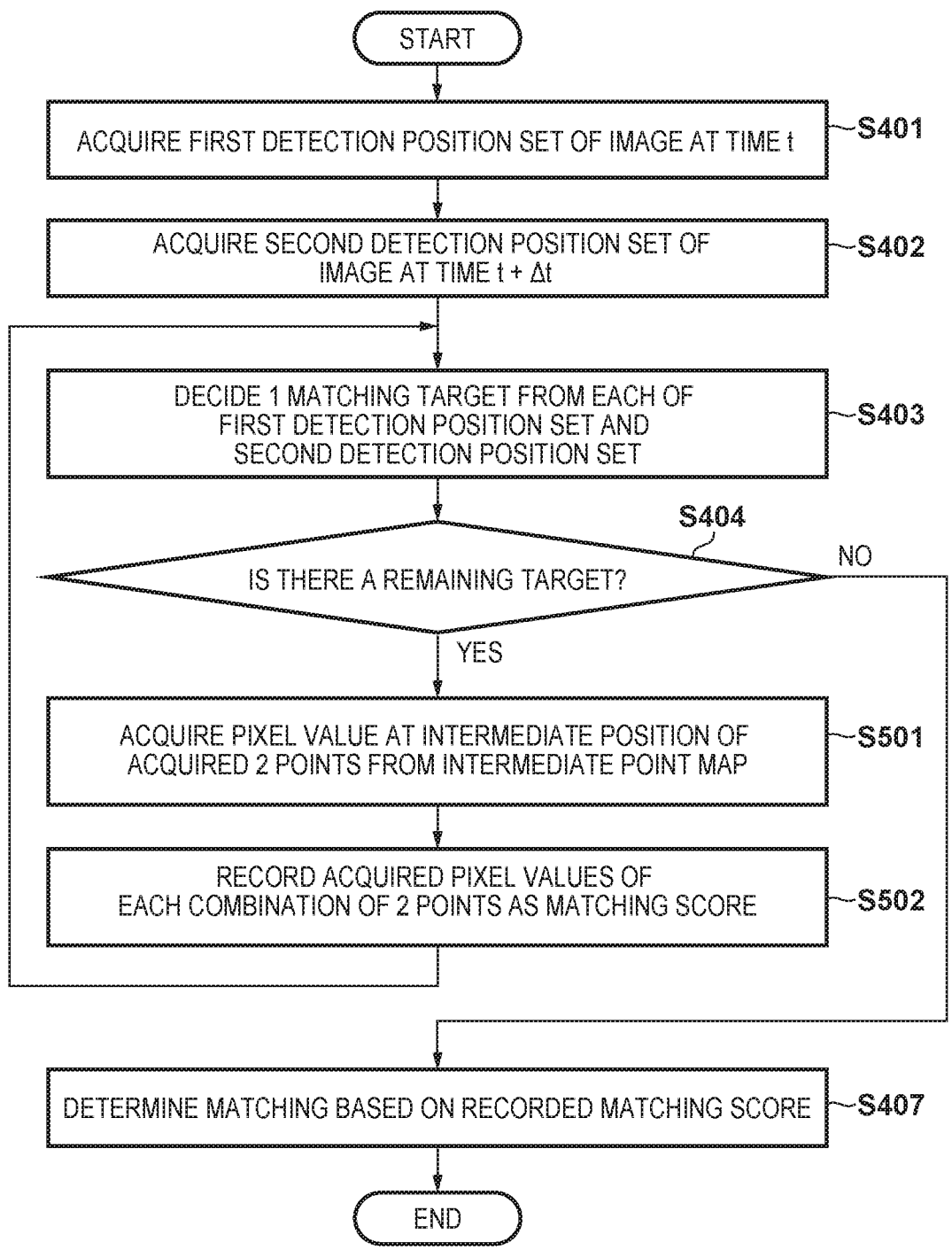
FIG. 5 is a flowchart of an example of generation of an intermediate point map according to the first embodiment.

FIG. 5 is a flowchart of an example of the processing procedure of image processing using an intermediate point map according to this embodiment. The processes of steps S401 to S404 and step S407 are the same as in FIG. 4, and a repetitive description thereof will be omitted. Steps S403, S404, and S501 and step S502 correspond to steps S307 and S308 in FIG. 3, respectively. In step S501, the determination unit 209 acquires the pixel value of the pixel of the intermediate point of the line segment that connects the coordinates of the detection positions selected in step S403 on the intermediate point map. This processing will be described with reference to FIGS. 8A, 8B, and 9B. FIGS. 8A and 8B have been described above. In this case, the determination unit 209 generates a map having different pixel values at the intermediate point of a line segment that connects the detection positions of the objects respectively matching the neck positions 801 and 802 and in a region other than that region.

Figure 9B:
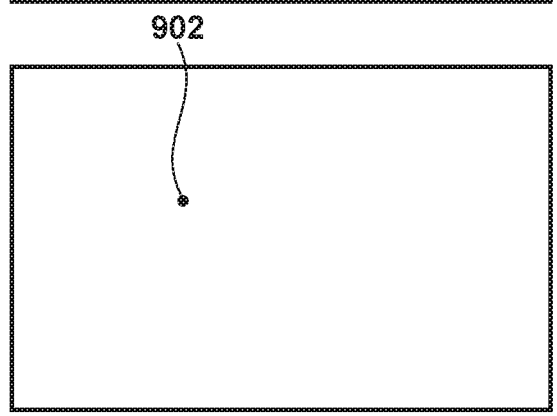

The intermediate point estimation unit 206 generates an intermediate point map ideally such that a point representing the intermediate point is output to the coordinates of the intermediate position of the line segment that connects the coordinates corresponding to the neck positions 801 and 802. FIG. 9B is a view showing a thus generated intermediate point map, and shows an output intermediate point 902. FIG. 9B shows an example in which an intermediate point map concerning one person is output. However, the present invention is not particularly limited to this. For example, if a plurality of persons are captured in the captured image, a plurality of intermediate points according to the detection positions of the persons are output on the intermediate point map. In this example, estimation and intermediate point map generation are performed such that the value of the pixel of the intermediate point between the neck positions of the same person is close to 1, and the value of a pixel value in an otherwise region is close to 0.

Note that in the intermediate point map, the intermediate point may be represented by one pixel, or may be represented by a local region. That is, the intermediate point estimation unit 206 need not estimate such that a value is output only in one pixel, and may perform estimation and intermediate point map generation such that the values in a local region near one pixel are close to 1. The intermediate point map may have a pixel value distribution according to a Gaussian distribution with respect to the intermediate point as the center. According to this arrangement, for example, even if the detection position by the detection unit 202 has a deviation, a deviation caused by the deviation of the detection position hardly occurs in the value calculated in step S308, and the robustness of matching can be improved.

The determination unit 209 can select one object at each of times t and t+Δt, and acquire the pixel value of the intermediate point of the coordinates on the intermediate point map, which correspond to the detection positions of the selected objects. Additionally, within the allowable range of the processing cost, the determination unit 209 may refer to pixel values within a predetermined range (for example, a range of 3×3 pixels) near the intermediate point and acquire the value for the intermediate point. For example, the determination unit 209 may acquire the maximum pixel value, the average pixel value, or the median of the pixel values within the predetermined range near the intermediate point. Alternatively, within the predetermined range near the intermediate point, the determination unit 209 may acquire a weighted average using a weight distribution in which the weight becomes large near the intermediate point. Thus, the determination unit 209 can acquire the value using a method of generating a difference in the value depending on whether the point is the intermediate point between the matching targets. This method is particularly effective in a case in which the intermediate point map has a pixel value distribution with the intermediate point at the center. That is, by referring to the region within the predetermined range, even if, for example, a partial loss occurs in data due to an estimation error, or even if a detection position deviates, matching with improved robustness can be performed by referring to the pixel values in the local region.

In step S502, the determination unit 209 stores the value acquired in step S501 in a storage device as a matching score for the set of objects together with the combination information of the detection positions, and returns to step S403. The storage device may be the external storage device 104 or may be a storage device connected via wireless communication. As described above, the combination of detection positions to be selected next in step S403 is selected from the combinations that are not stored in the storage device yet at that point of time.

The distance estimation unit 207 can generate a map (to be referred to as a distance map hereinafter) in which the pixel value of the intermediate point of a line segment that connects the detection positions of objects to be matched has a value representing the length of the line segment. In the distance map, the intermediate point of the line segment that connects the detection positions of the objects to be matched and a region other than that region may have different pixel values. In the distance map, the pixel value of the intermediate point of the line segment between identical parts of identical individuals may have a value proportional to the distance of the line segment. That is, the pixel value of the intermediate point may be a value (to be referred to as an estimated value hereinafter) capable of obtaining the value of the length of the line segment when multiplied by a predetermined coefficient given in advance. In addition, the distance estimation unit 207 may separately generate a map in which the pixel value of the intermediate point of the line segment that connects the detection positions of the objects to be matched has a value proportional to the difference between the x-coordinate values of the coordinates of the detection positions and a map in which the pixel value of the intermediate point has a value proportional to the difference between the y-coordinate values of the coordinates of the detection positions. The maps to be generated by the distance estimation unit 207 are not limited to these. In an example, the pixel value set in the distance map is an arbitrary value representing the length of the line segment that connects the detection positions of the objects to be matched. A description will be made below assuming that the distance estimation unit 207 generates a map in which the above-described pixel value of the intermediate point has a value proportional to the value of the length of the line segment that connects the detection positions of the objects to be matched.

To cause the generation CNN provided in the distance estimation unit 207 to perform such learning, the distance estimation unit 207 is given, as correct answer data, a map having a distribution of pixel values as described above, which are output when the feature amounts of two images including objects to be matched are input to the CNN. The distance estimation unit 207 can perform learning by performing back propagation using, for example, a mean square error based on the correct answer data and the output obtained when the two images are input such that the correct answer data can be output when the two images are input. The mean square error is known, and a detailed description thereof will be omitted.

In step S307, the determination unit 209 can acquire the pixel value of the intermediate point of the line segment that connects coordinates on the distance map, which correspond to the coordinates of the detection positions of one set of objects in the two images. Next, in step S308, the determination unit 209 multiplies the acquired pixel value by a predetermined coefficient and calculates the difference between the value obtained by multiplying the predetermined coefficient and the value of the length of the line segment that connects the corresponding coordinates. The determination unit 209 can acquire a score to be used for matching based on the calculated difference, and details will be described later in step S603. In step S309, the determination unit 209 performs matching, as described above, using the score recorded in step S308.

Figure 6:
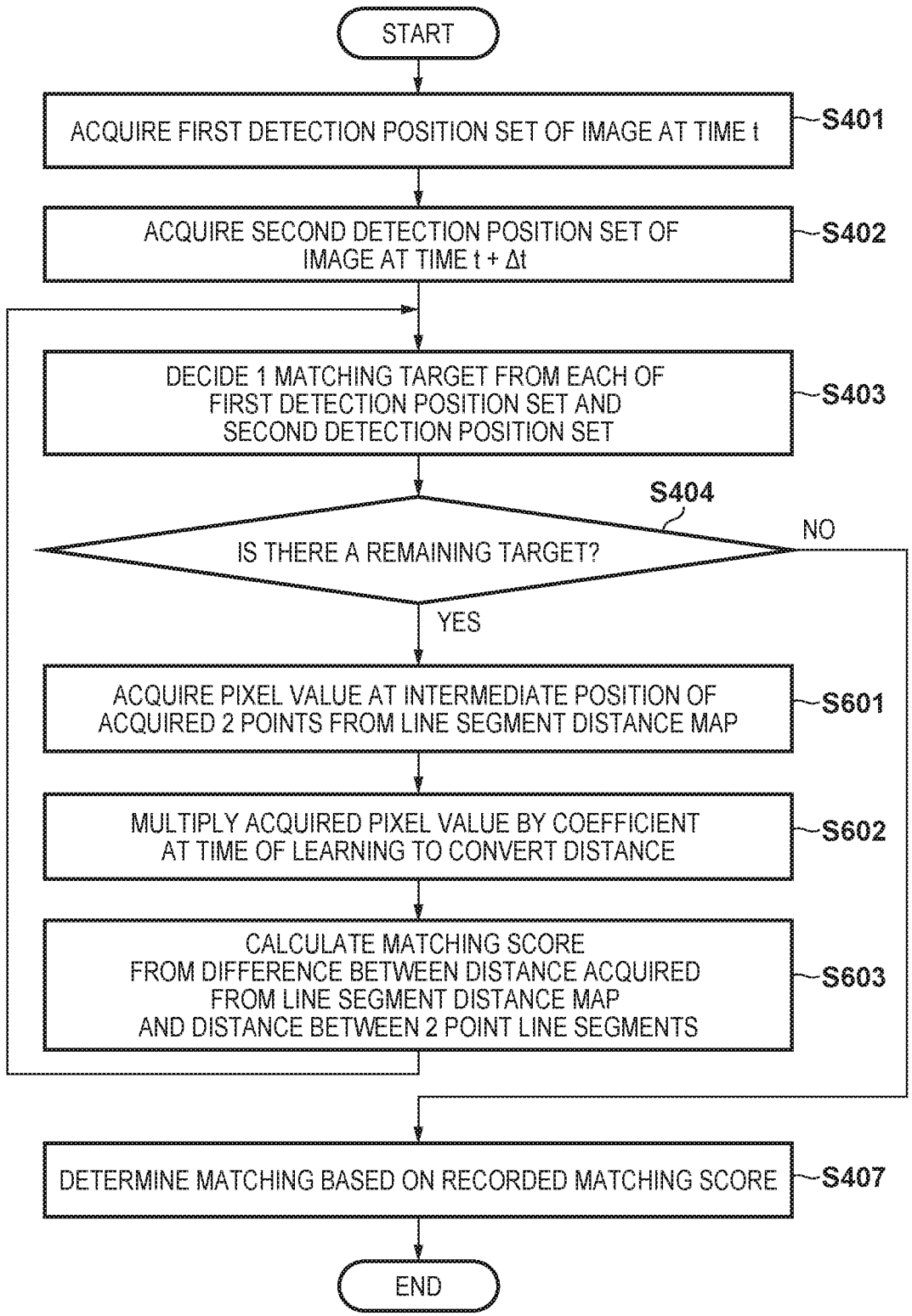
FIG. 6 is a flowchart of an example of generation of a distance map according to the first embodiment.

FIG. 6 is a flowchart of an example of the processing procedure of image processing using a distance map according to this embodiment. The processes of steps S401 to S404 and step S407 are the same as in FIG. 4, and a repetitive description thereof will be omitted. Steps S403, S404, and S601 and steps S602 and S603 correspond to steps S307 and S308 in FIG. 3, respectively. In step S601, the determination unit 209 refers to the pixel value of the intermediate point of the line segment that connects the coordinates of the detection positions selected in step S403 on the distance map, and acquires the pixel value. This processing will be described with reference to FIGS. 8A, 8B, and 9C. FIGS. 8A and 8B have been described above.

Figure 9C:
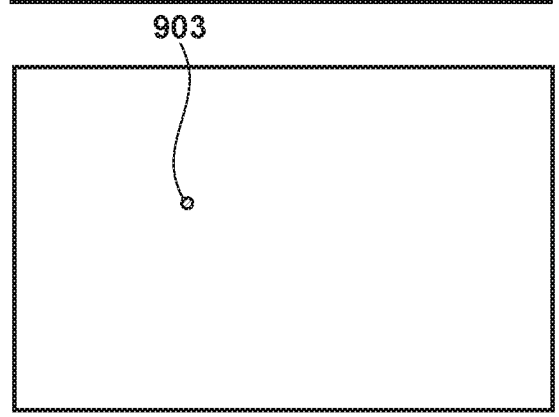

In this case, the distance estimation unit 207 generates a distance map ideally such that the estimated value is output to the coordinates of the intermediate position of the line segment that connects the neck positions 801 and 802. FIG. 9C is a view showing a distance map generated in this way. In the distance map, an estimated value as described above is output to an intermediate point 903 of the line segment that connects points on the distance map corresponding to the neck positions 801 and 802. FIG. 9C shows an example in which a distance map concerning one person is output. However, the present invention is not particularly limited to this. For example, if a plurality of persons are captured in the captured image, an estimated value is output to each of the pixels of the intermediate position of the line segment that connects positions corresponding to the same person.

Note that the estimated value need not always be output to the intermediate point, and may be output to the distance map by another method such that the association with the detection position of the same object can be known. For example, in the distance map, the estimated value may be output such that the association with a line segment that connects two detection positions can be known. As a detailed example, a distance map may be generated such that the pixel values of a whole line segment that connects detection positions on the distance map, which correspond to two objects, are estimated values. Alternatively, a distance map may be generated such that each pixel in a local region having, at the center, the intermediate point of a line segment that connects two detection positions has an estimated value. With this arrangement, for example, even if the detection position by the detection unit 202 has a deviation, the value referred to by the determination unit 209 readily becomes a desired value, and the robustness of matching can be improved.

The determination unit 209 can select one object at each of times t and t+Δt, and acquire the pixel value of the intermediate point of a line segment that connects the coordinates of the detection positions (for example, joint positions) of the selected objects on the distance map. According to this arrangement, in step S603 to be described later, the absolute value of the difference between the length of the line segment that connects the detection positions of the objects to be matched and, for example, a value calculated from the pixel value of the intermediate point is readily close to 0. In addition, an absolute value obtained by performing similar calculation for the detection positions of objects not to be matched readily separates from 0.

In step S602, the determination unit 209 multiplies the pixel value acquired in step S601 by a coefficient given in advance, thereby calculating the estimated length of the line segment. That is, if the combination of the selected objects represents the objects to be matched, a value assumed to equal the distance between the coordinates on the distance map is calculated.

In step S603, the determination unit 209 calculates the difference between the value calculated in step S602 and the length of the line segment that connects one set of coordinates. Next, the determination unit 209 can acquire a score to be used for matching based on the absolute value of the calculated difference. The score acquisition method is not particularly limited. Considering that the smaller the absolute value calculated here is, the higher the possibility that the objects correspond is, the determination unit 209 may acquire the score by performing conversion for making the score high as the absolute value becomes small. For example, the determination unit 209 may calculate the reciprocal of such an absolute value as a score, or may calculate, as a score, a power of an exponential by a value obtained by adding a negative sign to such an absolute value. From the viewpoint of using scores in another map together, the determination unit 209 may calculate a score using the distance map within the range of 0 to 1 such that the higher the score is, the higher the possibility that the objects correspond is. That is, when the above-described reciprocal of the absolute value is used as a score, considering that the score infinitely diverges if the absolute value is sufficiently small, the determination unit 209 may output a score of 1 if, for example, the absolute value is smaller than a preset lower limit value. When a power of an exponential by a value obtained by adding a negative sign to the above-described absolute value is used as a score, the determination unit 209 can directly use the calculated value as a score. In this embodiment, the determination unit 209 calculates a score using the distance map within the range of 0 to 1. However, the range may appropriately be adjusted in accordance with the calculation method of a score in another map. Next, the determination unit 209 stores the score calculated here and the combination of detection positions in a storage device, and returns to step S403.

The ID estimation unit 208 can generate a map (to be referred to as an ID map hereinafter) having identification information (pixel value) representing the same object at positions determined in accordance with the detection positions of objects estimated to correspond to each other. For example, the ID estimation unit 208 can generate a map in which regions corresponding to the detection positions of two objects to be matched have the same pixel value. In the ID map, regions corresponding to the detection positions of two objects to be matched and a region other than these may have different pixel values. The ID estimation unit 208 can generate a map in which, for example, a region corresponding to a detection position at time t and a region corresponding to a detection position at time t+Δt have the same pixel value. As an example, the ID estimation unit 208 may generate a map in which a pixel value (to be referred to as an ID value hereinafter) representing identification information unique to an object is held in a region on each detection position. Additionally, in this example, only one map in which regions on detection positions of objects to be matched have equal pixel values is generated. However, the number of maps to be generated by the ID estimation unit 208 is not particularly limited to one. For example, the ID estimation unit 208 may generate a map for time t and a map for time t+Δt. That is, the ID estimation unit 208 can generate maps such that a region on a detection position on a map for time t and a region on the detection position of the object on a map for time t+Δt have equal pixel values. According to the processing of generating two maps, for example, at time t+Δt, even if another object moves to a position where an object has existed at time t, it is possible to acquire while discriminating the objects and perform matching.

The ID estimation unit 208 can generate a map in which the variance of pixel values in regions on the detection positions of objects to be matched is minimized, and the variance of the average of pixel values on detection positions that correspond and the average of pixel values on detection positions that do not correspond is maximized. The CNN used by the ID estimation unit 208 may be learned such that outputting a map having such a pixel value distribution is the correct answer. That is, a loss evaluation value based on the above variance is calculated from an ID map obtained by inputting two image data for learning to the CNN, and learning can be performed by performing back propagation using the loss evaluation value. If an ID value is given for each object in learning data in advance, learning using the map may be performed. That is, the CNN used by the ID estimation unit 208 may be learned using, as correct answer data, an ID map representing the ID value in an object at each position of image data. In this case, the ID estimation unit 208 can perform learning by performing back propagation using a cross entropy error based on, for example, an output and the correct answer data such that the correct answer data can be output when the two image data are input.

As for the ID map, in step S307, the determination unit 209 can acquire the pixel value on each detection position for one set of objects in the two images. The determination unit 209 may acquire a pixel value on an acquired region. The determination unit 209 calculates the difference between the acquired pixel values. The determination unit 209 can acquire a score to be used for matching based on the calculated difference, and details will be described later in step S702. In step S309, the determination unit 209 performs matching, as described above, using the score recorded in step S308.

Figure 7:
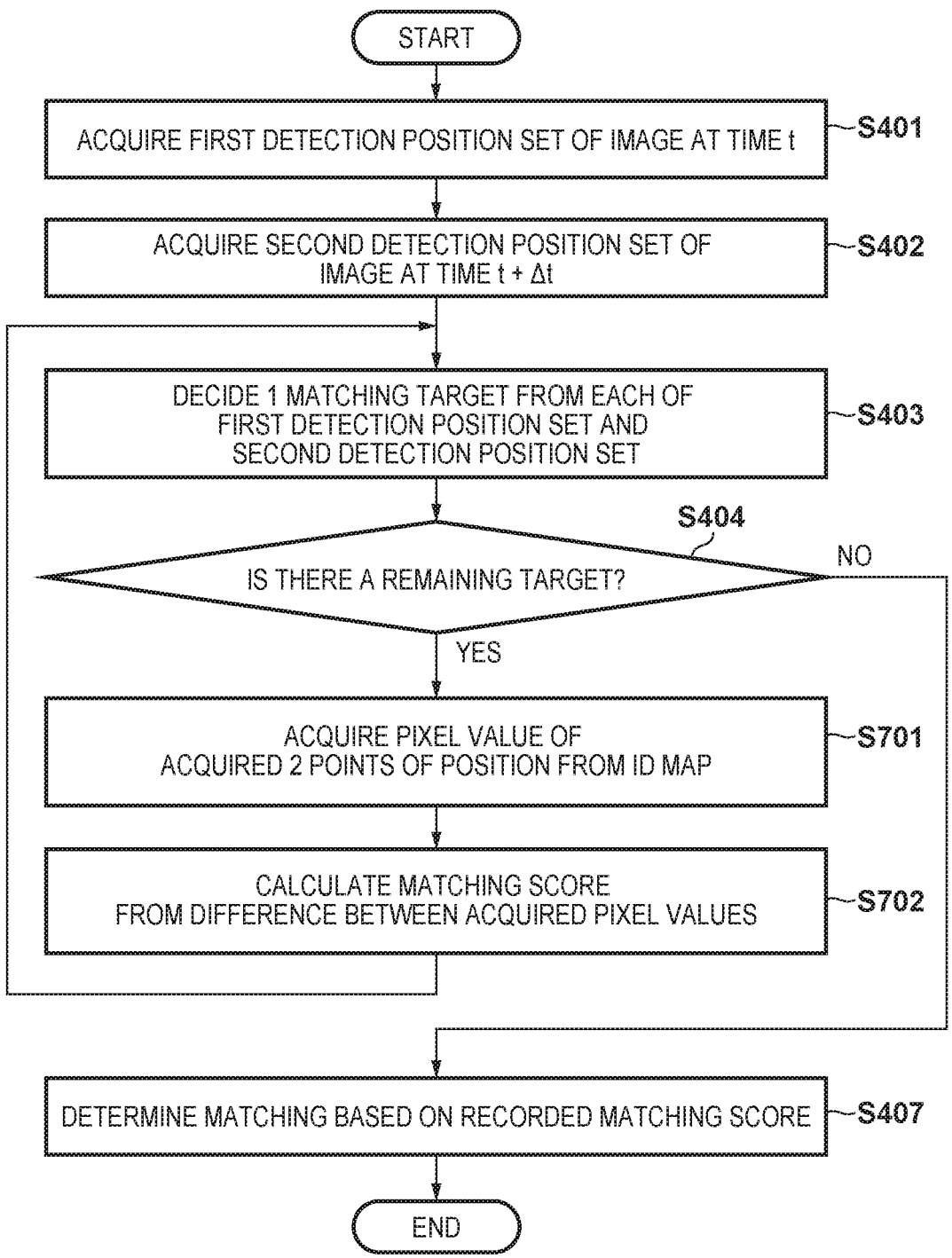
FIG. 7 is a flowchart of an example of generation of an ID map according to the first embodiment.

FIG. 7 is a flowchart of an example of the processing procedure of image processing using an ID map according to this embodiment. The processes of steps S401 to S404 and step S407 are the same as in FIG. 4, and a repetitive description thereof will be omitted. Steps S403, S404, and S701 and step S702 correspond to steps S307 and S308 in FIG. 3, respectively. In step S701, the determination unit 209 refers to pixel values on the detection positions selected in step S403 on the ID map, and acquires the pixel values. This processing will be described with reference to FIGS. 8A, 8B, and 9D. FIGS. 8A and 8B have been described above.

Figure 9D:
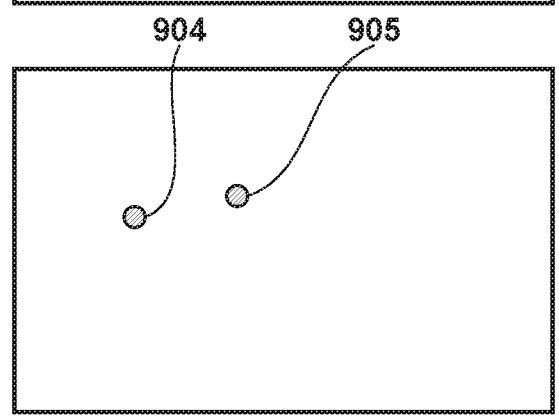

In this case, the ID estimation unit 208 generates a map in which regions on the detection positions of the objects that match the neck positions 801 and 802, respectively, and a region other than the regions have different pixel values. The ID estimation unit 208 generates an ID map ideally such that the same ID value is output to the regions corresponding to the neck positions 801 and 802. FIG. 9D is a view showing an ID map generated in this way, and the same value (represented by hatching in this example) is output to the pixels in regions 904 and 905 corresponding to the neck positions 801 and 802, respectively. FIG. 9D shows an example in which an ID map concerning one person is output. However, the present invention is not particularly limited to this. For example, if a plurality of persons are captured in the captured image, in accordance with the number of persons, an ID value is output to a position corresponding to each person such that the same value is output for the same person as much as possible on the ID map.

In the ID map, the ID value may be output to the pixel in the region corresponding to the detection position, as described above, or may be output to another pixel associated with the detection position. For example, the ID value may be output to a pixel in a local region having, at the center, coordinates corresponding to the detection position on the map. The ID estimation unit 208 may generate an ID map such that pixel values on a line segment that connects positions of the objects to be matched, which correspond to the detection position, become equal. In this case, the ID estimation unit 208 can generate an ID map such that the variance of pixel values in a region on the line segment that connects the detection positions of the objects to be matched becomes small, and the variance of the average of pixel values of a line segment that connects the detection positions of the objects that correspond and the average of pixel values of a line segment that connects the detection positions that do not correspond becomes large. When the range to output the ID value on the ID map is made wide, for example, even if the detection position by the detection unit 202 has a deviation, a correct ID value can easily be referred to.

The determination unit 209 can select one object at each of times t and t+Δt, and acquire, for the detection positions (for example, joint positions) of the selected objects, the pixel value on the coordinates of each detection position in the ID map. According to this arrangement, in step S702 to be described later, the absolute value of the difference between the pixel values on the detection positions of the objects to be matched is readily close to 0. An absolute value obtained by performing similar calculation for objects not to be matched readily separates from 0.

In step S702, the determination unit 209 calculates the difference between the values acquired in step S701. Next, the determination unit 209 can acquire a score to be used for matching based on the value of the calculated difference. The score acquisition method is not particularly limited. Considering that the smaller the value of the difference calculated as described above is, the higher the possibility that the objects are identical is, the determination unit 209 may acquire the score by performing conversion for making the score high as the calculated value becomes small. As for the conversion method, the conversion can be performed in the same way as in step S603, and a repetitive description thereof will be omitted. In this embodiment, the score using the ID map is calculated within the range of 0 to 1. However, the range may appropriately be adjusted in accordance with the calculation method of a score in another map. Next, the determination unit 209 stores the score calculated here and the combination of detection positions in a storage device, and returns to step S403.

In addition, the ID estimation unit 208 may generate an ID map in which each pixel has a K-dimensional vector value in place of an ID map in which each pixel has a one-dimensional scalar value. In this case, in step S701, the determination unit 209 can acquire, for the combination of one set of objects, K-dimensional vector values each having, as elements, K pixel values to be referred to at the same position in K maps at each of the detection positions of the objects. Next, in step S702, the determination unit 209 may calculate a matching score using the K-dimensional vector. As the score of one set of objects, the determination unit 209 may calculate, for example, a cosine similarity using such K-dimensional vector values. When the score is calculated as a cosine similarity, the score range is set to 0 to 1. Additionally, the closer to 1 the score is, the higher the possibility that the objects correspond is. Hence, integration with a score in each map can easily be performed. As described above, if the generation unit 204 generates a plurality of maps representing one association map, the expressive power of the association map can be improved.

The image processing apparatus according to this embodiment can store, in the storage device, the output of the detection CNN at an arbitrary time, that is, the detection result of an object from an image and the intermediate feature of the image. For example, the output of the detection CNN at time t can be stored in the storage device. The storage device may be the external storage device 104 or may be a storage device connected via wireless communication. In this case, the detection unit 202 can generate the detection result of the object and the intermediate feature of the image from an image newly acquired at time t+Δt. Next, the integration unit 203, the generation unit 204, and the determination unit 209 can perform matching using the stored detection result and intermediate feature of the image at time t in addition to the detection result and intermediate feature for the image at time t+Δt. As described above, instead of starting processing after acquiring two images, as shown in FIG. 3, processing can be performed in real time while sequentially acquiring images one by one. According to this arrangement, in one matching processing, the detection unit 202 need only perform processing for one image. It is therefore possible to implement efficient processing. Note that after the matching processing, the detection result and intermediate feature for the image at time t in the storage device may be overwritten by the detection result and intermediate feature for the image at time t+Δt. The image processing apparatus according to this embodiment may perform processing while sequentially acquiring images, and may also perform processing using images at two times acquired in advance.

In addition, the image processing apparatus according to this embodiment can also perform, for example, stereo matching or the like from the viewpoint that spatial continuity is also grasped by performing matching of two temporally continuous images.

Figure 11A:
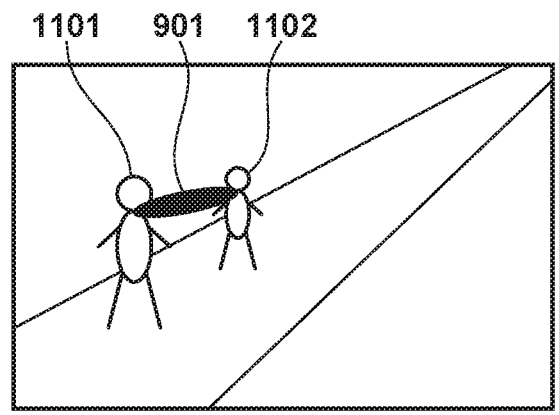
FIGS. 11A to 11D are views showing examples of image display in the image processing apparatus according to the first embodiment.
Figure 11B:
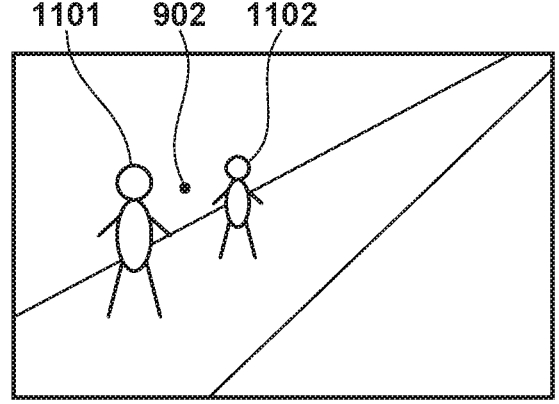
Figure 11C:
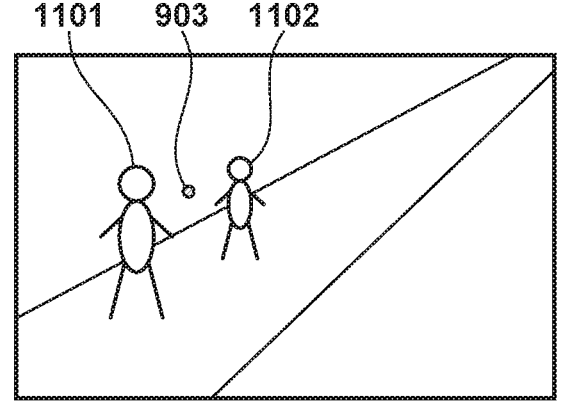
Figure 11D:
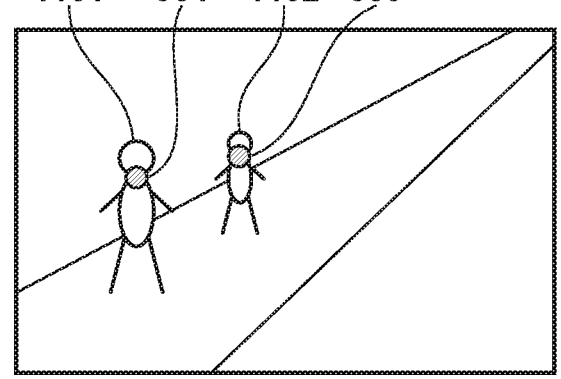

Also, from the viewpoint of making it easy to confirm whether each map can correctly perform processing, the output device 110 may display the map and images at the two times in a superimposed manner. FIGS. 11A to 11D show examples of a monitor that performs such superimposing display. In FIG. 1A, the objects shown in FIGS. 8A and 8B are displayed in a superimposed manner on FIG. 9A. That is, a line segment map and the objects are displayed in a superimposed manner. FIGS. 11B, 11C, and 11D correspond to FIGS. 9B, 9C, and 9D, respectively, like FIG. 11A. FIGS. 11A to 11D may be displayed separately or may further be displayed in a superimposed manner. According to this display, it is easy to confirm whether a region on a line segment that connects the detection positions of objects to be matched between images is correctly output. That is, it is possible to easily confirm whether an appropriate map is generated. Hence, it is possible to obtain an image processing apparatus that can perform visual confirmation in addition to operation confirmation at the time of execution of image processing when confirming whether learning data of the generation CNN is correctly created, and improves the efficiency of confirmation.

As another example, instead of displaying images at different times in a superimposed manner, images at different times may be continuously displayed like a moving image. In this case, for example, on the image at time t, the detection result (for example, FIG. 8A) of an object from this image may be superimposed, and on the image at time t+Δt, the detection result (for example, FIG. 8B) of an object from this image may be superimposed.

Note that when matching determination considering a plurality of maps is performed, as described above, for example, even if the accuracy of matching is low in one map, the matching can be performed more correctly. For example, even if the objects at the same time are close, and the line segments that connect the detection positions of the objects to be matched on the line segment map are connected, the matching target can more correctly be specified using matching referring to the intermediate point between the detection positions together. Additionally, when the distance map is used particularly together with the intermediate point map or the line segment map, it can be confirmed whether the intermediate point position referred in the distance map matches the intermediate point position represented by the intermediate point map or is included in the line segment represented by the line segment map. When the condition is satisfied, and it is determined whether the line segment distance calculated from the pixel values output to the intermediate point position referred to in the distance map is correct, it is possible to more correctly specify the matching target. For example, even if a value close to the line segment distance of the combination of the detection positions of another person happens to be output to the intermediate point position of the combination in the distance map, if the value at the corresponding position in the intermediate point map is small, it can be found that the combination is not correct. As described above, when the maps are used in combination with each other, the matching accuracy is expected to improve.

According to this arrangement, when a map representing the correspondence between the objects in a plurality of captured images is generated, and matching of the objects is performed based on the map, it is possible to obtain an image processing apparatus for performing image matching at a lower processing cost.

Second Embodiment

An image processing apparatus according to the second embodiment performs matching of objects detected, between captured images at time t and time t+Δt, from the two images at time t and time t+Δt and images (to be referred to as intermediate images hereinafter) at times between the two times. For this processing, the image processing apparatus according to the second embodiment has the same arrangement as in the first embodiment except that the image processing apparatus includes an image acquisition unit 1002 and an extraction unit 1003, and a repetitive description thereof will be omitted.

Figure 10:
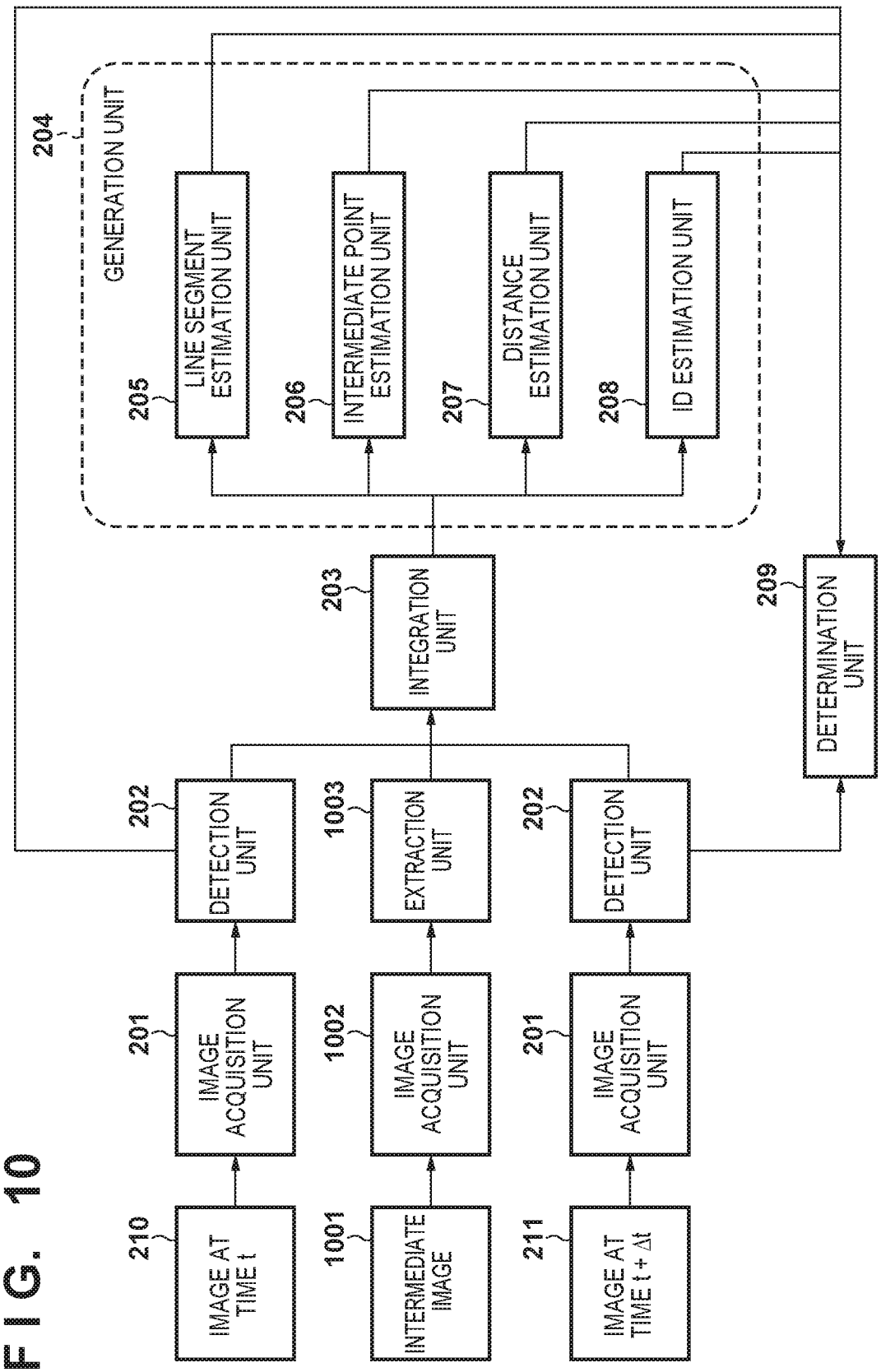
FIG. 10 is a block diagram showing an example of the functional arrangement of an image processing apparatus according to the second embodiment.

FIG. 10 is a block diagram showing an example of the functional arrangement of the image processing apparatus according to the second embodiment. The image acquisition unit 1002 acquires, from a camera 112, an intermediate image at a time between an image 210 and an image 211, which is an input to the image processing apparatus according to this embodiment. The number of images acquired by the image acquisition unit 1002 is not particularly limited. The extraction unit 1003 can extract a feature amount to be used to assist matching of objects from the intermediate image and output it to an integration unit 203. The feature amount extracted for this purpose by the extraction unit 1003 is not particularly limited if it can assist matching. For example, the extraction unit 1003 may include, as a CNN, a detection CNN as in a detection unit 202, and output an intermediate feature from the same detection process as the detection by the detection unit 202. In addition, the extraction unit 1003 may include a predetermined CNN lighter than the detection CNN.

The integration unit 203 integrates feature amounts acquired from the images. In this example, the integration unit 203 can concatenate feature amounts extracted by the detection CNN from the images at time t and time t+Δt and a feature amount output from the intermediate image. Next, a generation unit 204 generates a map representing the correspondence between objects in the images at time t and time t+Δt from the feature amount concatenated by the integration unit 203. Hence, a generation CNN included in each estimation unit can perform learning based on the intermediate feature amount from the detection CNN and the output from the extraction unit 1003. This learning can be performed in the same way as the estimation units according to the first embodiment except that the output of the extraction unit 1003 is included in the input.

According to this arrangement, not only the feature amounts at time t and time t+Δt but also the feature amount at the intermediate point between the times is input, thereby obtaining information such as the detection position of an object between the times. It is therefore possible to easily estimate the line segment between detection positions and the position of the intermediate point of the line segment in each map.

Third Embodiment

An image processing apparatus according to the third embodiment performs matching of objects detected from images based on a map generated from images captured by a plurality of cameras. For this processing, the image processing apparatus according to the third embodiment has the same arrangement as in the first embodiment except that the image processing apparatus includes a camera 1202 and a camera 1203, and a repetitive description thereof will be omitted.

FIG. 12 is a bird's-eye view showing an example in which the two cameras 1202 and 1203 capture a vehicle 1201 from different angles. In the example shown in FIG. 12, an image acquisition unit 201 acquires images captured by the two cameras 1202 and 1203. The image acquisition unit 201 may acquire images captured by the two cameras 1202 and 1203 at the same time, or may acquire images having a predetermined frame interval between the cameras. FIG. 13A shows an image captured by the camera 1202, and FIG. 13B shows an image captured by the camera 1203.

A detection unit 202 detects a specific object serving as an object from each image acquired by the image acquisition unit 201. In this example, for the descriptive convenience, the detection CNN is assumed to be learned to detect an approximate center position of the vehicle. However, the learning method of the detection CNN is not particularly limited. The detection CNN may be learned to detect, for example, a specific part of a vehicle body. Reference numerals 1301 and 1302 denote approximate center positions of the vehicle 1201 detected by the detection CNN in the images. In this example, the detection CNN detects a vehicle. However, the detection target is not particularly limited to this. For example, the detection CNN may detect a person, as in the example of the first embodiment. That is, identical parts of corresponding persons may be detected from images captured from multiple directions.

Figure 14:
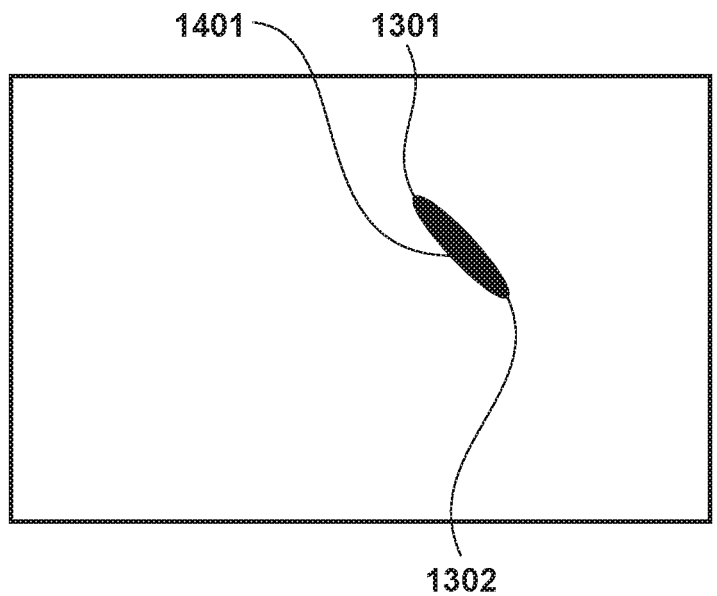
FIG. 14 is a view showing an example of map generation in the image processing apparatus according to the third embodiment.

An integration unit 203 concatenates feature amounts acquired from the images, as in the first embodiment. A generation unit 204 generates a map representing the correspondence between objects in the images based on the concatenated feature amount, as in the first embodiment. That is, a generation CNN included in each estimation unit is learned to receive the feature amounts of the images captured by the plurality of cameras as described above and generate a map similar to the first embodiment. FIG. 14 shows an example of a line segment map generated in this way.

According to this arrangement, it is possible to obtain an image processing apparatus that performs matching of objects detected in images even in a case in which images captured by a plurality of cameras are input.

Fourth Embodiment

A detection CNN provided in an image processing apparatus according to the fourth embodiment is learned to detect an object from an image and perform a task of identifying each detected object. That is, the image processing apparatus according to the fourth embodiment has the same arrangement as in the first embodiment except that point, and a repetitive description thereof will be omitted.

The detection CNN according to the fourth embodiment may be learned to output identification information unique to a person to the detection position of each joint such that detected joints (a neck, a shoulder, an elbow, and the like) can be discriminated on a person basis in a case in which, for example, a person is detected. In this case, an ID estimation unit 208 can create an ID map based on an intermediate feature amount output from the detection CNN and perform the same processing as in the first embodiment. The learning method of the detection CNN according to the fourth embodiment is not particularly limited. The detection CNN may perform learning by a method described in, for example, Newell (A. Newell et al, "Associative Embedding: End-to-End Learning for Joint Detection and Grouping", Advances in Neural Information Processing Systems 30 (NIPS), 2017). When the detection CNN is learned to include a task of discriminating each detected joint to determine whether it belongs to same person or another person, intermediate features output from the detection CNN are expected to include more information such as edge information or color information important for the discrimination of objects. It is therefore possible to expect that the accuracy of matching performed using the intermediate features improves.

Additionally, it can be said that the ID estimation unit 208 according to the first embodiment is learned to perform a task of identifying an object. Hence, concerning the processing of generating an ID map, the section from the detection CNN according to the fourth embodiment to the generation CNN of the ID estimation unit 208 may be formed as one network. In this case, the loss of the learning task of the generation CNN may be back-propagated up to the detection CNN, thereby performing end-to-end learning such that information effective for estimation of the ID of an object is reflected on the intermediate feature amount output from the detection CNN.

The ID estimation unit 208 according to the fourth embodiment can hold the ID value of the object for a predetermined period. For example, if objects that have been matched once cannot be matched by processing at the next time, the ID estimation unit 208 can store the ID values of the objects in the storage device. In addition, the ID estimation unit 208 can store the ID values of the objects in the storage device for a predetermined period. If a combination capable of matching, which has an ID value equal to the stored ID value of the object, is detected, the ID estimation unit 208 can perform matching based on the stored ID value. The storage device may be an external storage device 104 or may be a storage device connected via wireless communication. According to this processing, it is possible to resume matching for an object whose matching is temporarily interrupted because it is occluded or the like.

Fifth Embodiment

An image processing apparatus according to this embodiment generates, for objects detected in captured images at three or more times, a map representing the correspondence between the objects in the captured images. Next, based on a plurality of generated maps, objects detected in the plurality of captured images are matched. For this processing, the image processing apparatus according to this embodiment has the same arrangement as in the first embodiment, and a repetitive description thereof will be omitted. That is, the image processing apparatus can perform the same processing as in the first embodiment except that an image acquisition unit 201 acquires images at three or more times, and the same processing as in the first embodiment is performed for each combination of images selected from the three or more images. For this processing, a storage device provided in the image processing apparatus according to this embodiment can store feature amounts acquired from images at past times. The number of times of feature amounts stored in the storage device is not particularly limited. The storage device may store, for example, feature amounts at a predetermined number of times, and every time a feature amount at a new time is stored, the oldest feature amount held in the storage device at that point of time may be deleted. The storage device may be the external storage device 104 or may be a storage device connected via wireless communication.

An integration unit 203 according to this embodiment can perform the same processing as in the first embodiment for all combinations of two of the images at the three or more times. However, the processing of the integration unit 203 is not particularly limited to this. For example, the integration unit 203 may integrate intermediate feature amounts based on the images at the three or more times. In this case, a generation CNN provided in each estimation unit of the generation unit 204 can generate a map representing the correspondence between objects in the images based on the integrated intermediate feature amounts at the three or more times. That is, learning can be performed in this way. The learning method of each generation CNN is not particularly limited, and learning may be done as in the first embodiment.

Figure 15:
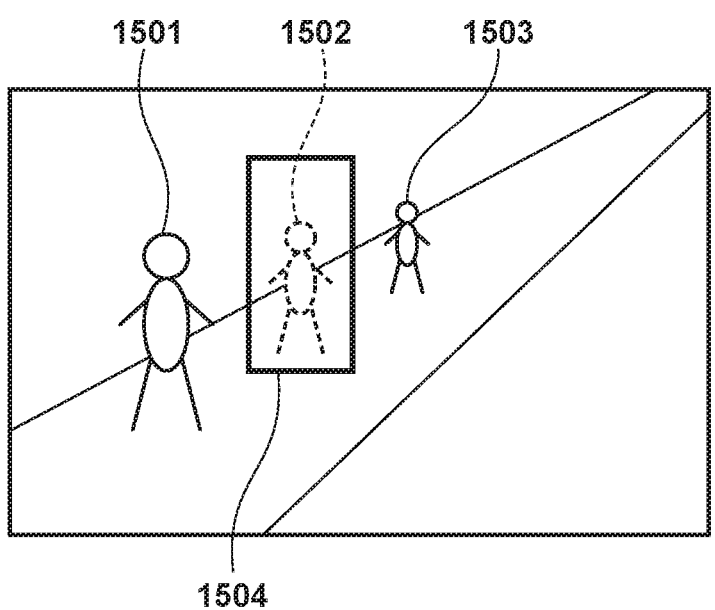
FIG. 15 is a view showing an example of a person according to each time in an image processing apparatus according to the fifth embodiment.

FIG. 15 shows an example for explaining matching processing by the image processing apparatus according to the fifth embodiment. Reference numerals 1501, 1502, and 1503 denote corresponding persons at time t, time t+Δt, and time t+2×Δt, respectively. Reference numeral 1504 denotes a shielding object 1504 which occludes the person 1502 in the image of this example. In this case, the image processing apparatus according to this embodiment can perform matching of the persons 1501 and 1503. That is, for example, even if sequential matching at a predetermined interval Δt is difficult due to an impeding factor such as occlusion, objects to be matched can be associated by performing image processing at a predetermined interval 2×Δt. This matching may be performed based on the images acquired at time t and time t+2×Δt, as described above, or may be performed based on a feature amount obtained by integrating feature amounts at time t, time t+Δt, and time t+2×Δt.

According to this arrangement, for example, when tracking a person continuously in a video or the like, a problem that matching of the person is interrupted during tracking can be suppressed. For example, if occlusion occurs in one of three frames (1502 in FIG. 15), matching of the remaining two frames (times t and t+2×Δt) is performed, thereby performing tracking while skipping the occluded portion.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-202618, filed Nov. 7, 2019, which is hereby incorporated by reference herein in its entirety.

What is claimed is:

1. An image processing apparatus comprising:
   a processor; and
   a memory storing executable instructions which, when executed by the processor, cause the image capturing apparatus to perform operations including:
   detecting an object from a captured image;
   generating a map representing a correspondence between objects detected in a plurality of captured images; and
   matching the objects detected in the plurality of captured images based on the generated map wherein the map contains, at a predetermined position determined in accordance with detection positions of the objects, information representing the correspondence between the objects, and the matching refers to the predetermined position that is determined based on coordinates obtained by converting coordinates of the detection positions of the objects into coordinates on the map.

2. The apparatus according to claim 1, wherein the matching refers to the predetermined position of the map, which is determined in accordance with the detection positions of the objects, and determines whether to match the objects.

3. The apparatus according to claim 1, wherein the map contains different pixel values at the predetermined position and at another position.

4. The apparatus according to claim 1, wherein the map shows a line segment between positions on the map, which correspond to the detection positions of the objects estimated to correspond with each other, or an intermediate point between the positions.

5. An image processing apparatus comprising:
   a processor; and
   a memory storing executable instructions which, when executed by the processor, cause the image capturing apparatus to perform operations including:
   detecting an object from a captured image;
   generating a map representing a correspondence between objects detected in a plurality of captured images; and
   matching the objects detected in the plurality of captured images based on the generated map,
   wherein the map contains, at a predetermined position determined in accordance with the detection positions of the objects, the information representing the correspondence between the objects, and the map contains, at the predetermined position, information representing a distance between positions on the map, which correspond to the detection positions of the objects estimated to correspond with each other.

6. The apparatus according to claim 1, wherein the map contains identification information representing the same object at the detection positions of the objects estimated to correspond with each other.

7. The apparatus according to claim 1, wherein the detecting detects a plurality of parts of in each of the objects, and the generating generates the map for each of the parts.

8. The apparatus according to claim 1, wherein the generating generates a plurality of maps different from each other, and
   the matching matches the objects detected in the plurality of captured images based on the plurality of generated maps.

9. The apparatus according to claim 1, wherein the generating generates the map based on an intermediate feature amount obtained in detection processing of the objects by the detecting.

10. The apparatus according to claim 1, wherein the detecting is learned to discriminate different objects.

11. The apparatus according to claim 1, wherein the plurality of captured images include a captured image at a first time and a captured image at a second time, which are obtained by the same image capturing device.

12. The apparatus according to claim 1, wherein the generating generates, based on a first captured image, a second captured image, and a third captured image, which are temporally or spatially arranged, the map representing the correspondence between the objects detected in the first captured image and the third captured image.

13. The apparatus according to claim 1, wherein the plurality of captured images include a first captured image, a second captured image, and a third captured image, which are temporally or spatially arranged,
   the generating generates the map representing the correspondence between the objects detected in the first captured image and the second captured image, and the map representing the correspondence between the objects detected in the first captured image and the third captured image.

14. The apparatus according to claim 1, wherein the detecting detects a part of the object.

15. The apparatus according to claim 1, wherein the object is a person, and the detecting detects a joint of the person.

16. The apparatus according to claim 1, wherein the operations further including displaying the map and the object in a superimposed manner.

17. A method of processing an image comprises:
   detecting an object from a captured image;
   generating a map representing a correspondence between objects detected in a plurality of captured images; and
   matching the objects detected in the plurality of captured images based on the generated map, wherein the map contains, at a predetermined position determined in accordance with detection positions of the objects, information representing the correspondence between the objects, and the matching refers to the predetermined position that is determined based on coordinates obtained by converting coordinates of the detection positions of the objects into coordinates on the map.

18. A non-transitory computer-readable storage medium storing a program that, when executed by a computer, causes the computer to perform a method of processing an image, the method comprises:
   detecting an object from a captured image;
   generating a map representing a correspondence between objects detected in a plurality of captured images; and
   matching the objects detected in the plurality of captured images based
   on the generated map, wherein the map contains, at a predetermined position determined in accordance with detection positions of the objects, information representing the correspondence between the objects, and the matching refers to the predetermined position that is determined based on coordinates obtained by converting coordinates of the detection positions of the objects into coordinates on the map.

\* \* \* \* \*